(12) United States Patent
Seack et al.

(10) Patent No.: US 8,967,541 B2
(45) Date of Patent: Mar. 3, 2015

(54) STRUCTURAL ARRANGEMENT, AIRCRAFT OR SPACECRAFT AND METHOD

(71) Applicants: Oliver Seack, Bremen (DE); Alexander Bruns, Bremen (DE)

(72) Inventors: Oliver Seack, Bremen (DE); Alexander Bruns, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 127 days.

(21) Appl. No.: 13/649,218

(22) Filed: Oct. 11, 2012

(65) Prior Publication Data
US 2013/0099062 A1 Apr. 25, 2013

Related U.S. Application Data

(60) Provisional application No. 61/546,764, filed on Oct. 13, 2011.

(30) Foreign Application Priority Data

Oct. 13, 2011 (DE) .......................... 10 2011 084 472

(51) Int. Cl.
*B64C 1/06* (2006.01)
*B29C 70/68* (2006.01)
(Continued)

(52) U.S. Cl.
CPC . *B64C 9/00* (2013.01); *B29C 70/68* (2013.01); *B64C 9/02* (2013.01); *B23P 11/00* (2013.01); *D10B 2505/02* (2013.01); *B29L 2031/3076* (2013.01); *D03D 25/005* (2013.01); *B29C 70/24* (2013.01)
USPC ...................................................... 244/131

(58) Field of Classification Search
USPC ........ 244/213, 131, 123.4, 119, 158.1, 159.4; 29/897; 428/105, 113, 119
See application file for complete search history.

(56) References Cited

U.S. PATENT DOCUMENTS

| | | |
|---|---|---|
| 661,346 A | 11/1900 | Lincoln |
| 1,843,170 A | 2/1932 | Meldrim |

(Continued)

FOREIGN PATENT DOCUMENTS

| | | |
|---|---|---|
| DE | 2757965 | 6/1979 |
| DE | 3546267 | 8/1986 |

(Continued)

OTHER PUBLICATIONS

Notice of Allowance for U.S. Appl. No. 13/649,203 dated Mar. 4, 2014.

(Continued)

*Primary Examiner* — Philip J Bonzell
(74) *Attorney, Agent, or Firm* — Jenkins, Wilson, Taylor & Hunt P.A.

(57) ABSTRACT

The present invention pertains inter alia to a structural arrangement, comprising a box structure, a first fibre portion which extends in a first plane, a second fibre portion which extends in a second plane, the first and the second fibre portion being interconnected at a crossing point thereof, the first fibre portion comprising a first portion on one side of the crossing point and a second portion on the other side of the crossing point, the first portion being connected to a first portion of the box structure and the second portion being connected to a second portion of the box structure, the second fibre portion forming, on one side of the crossing point, an inner web inside the box structure and, on the other side of the crossing point, an outer web outside the box structure.

15 Claims, 23 Drawing Sheets

(51) Int. Cl.
  *B64C 9/00* (2006.01)
  *B23P 11/00* (2006.01)
  *D03D 25/00* (2006.01)
  *B29C 70/24* (2006.01)
  *B64C 9/02* (2006.01)
  *B29L 31/30* (2006.01)

(56) References Cited

U.S. PATENT DOCUMENTS

| | | | |
|---|---|---|---|
| 3,818,951 A | 6/1974 | Greenwood | |
| RE28,672 E | 1/1976 | Wakeman | |
| 4,201,815 A | 5/1980 | Weiland et al. | |
| 4,382,712 A | 5/1983 | Buchs | |
| 4,395,450 A * | 7/1983 | Whitener | 428/116 |
| 4,584,226 A * | 4/1986 | Vitale et al. | 428/105 |
| 4,622,254 A | 11/1986 | Nishimura et al. | |
| 4,671,470 A | 6/1987 | Jonas | |
| 4,686,134 A | 8/1987 | Ono | |
| 4,715,560 A * | 12/1987 | Loyek | 244/117 R |
| 4,725,485 A | 2/1988 | Hirokawa | |
| 5,024,874 A | 6/1991 | Yasui | |
| 5,463,794 A | 11/1995 | Erland | |
| 5,945,053 A | 8/1999 | Hettinga | |
| 6,481,911 B1 | 11/2002 | Streuber | |
| 7,198,691 B2 | 4/2007 | Ludin et al. | |
| 7,425,103 B2 | 9/2008 | Perez-Sanchez | |
| 7,451,950 B2 | 11/2008 | Perez-Sanchez | |
| 7,521,108 B2 * | 4/2009 | Franklin et al. | 428/119 |
| 7,541,083 B2 | 6/2009 | Grose et al. | |
| 7,900,878 B2 | 3/2011 | Perez-Sanchez | |
| 8,220,744 B2 * | 7/2012 | Benthien | 244/131 |
| 8,322,656 B2 | 12/2012 | Pahl | |
| 8,328,134 B2 | 12/2012 | Wagner | |
| 8,642,151 B2 * | 2/2014 | Goering et al. | 428/57 |
| 8,833,697 B2 | 9/2014 | Seack et al. | |
| 2005/0175399 A1 | 8/2005 | Perez-Sanchez | |
| 2008/0173761 A1 | 7/2008 | Benthien | |
| 2009/0149100 A1 | 6/2009 | Goering | |
| 2010/0090062 A1 | 4/2010 | Wagner | |
| 2010/0148008 A1 | 6/2010 | Hernando Sebastian et al. | |
| 2011/0143085 A1 | 6/2011 | Blot et al. | |
| 2013/0091675 A1 | 4/2013 | Seack | |
| 2013/0092794 A1 | 4/2013 | Seack | |
| 2013/0094898 A1 | 4/2013 | Seack | |

FOREIGN PATENT DOCUMENTS

| | | |
|---|---|---|
| DE | 195 27 197 A1 | 1/1997 |
| DE | 102006035576 | 12/2007 |
| DE | 10 2009 024 789 | 12/2010 |
| DE | 102009043103 | 3/2011 |
| DE | 102007011613 | 7/2011 |
| DE | 10 2011 084472 | 1/2013 |
| EP | 1 145 841 | 10/2001 |
| EP | 1 595 787 | 11/2005 |
| EP | 1627726 | 2/2006 |
| FR | 2 412 782 | 7/1979 |
| WO | 2009/064594 | 12/2010 |
| WO | WO 2011/035860 | 3/2011 |

OTHER PUBLICATIONS

German Office Action for Serial No. 10 2011 084 433.3 dated Jun. 26, 2012.
German Office Action for Serial No. 10 2011 084 441.4 dated May 24, 2012.
German Office Action for Serial No. 10 2011 084 472.4 dated Jun. 26, 2012.
German Office Action for Serial No. 10 2011 084 438.4 dated May 23, 2012.
Partial European Search Report for Application No. 12188066.0 dated Jan. 23, 2013.
European Search Report for Application No. 12188066.0 dated Feb. 13, 2013.
European Search Report for Application No. 12188066.0 dated Apr. 26, 2013.
Extended European Search Report for Application No. 12188065.2 dated Apr. 25, 2013.
Notice of Allowance for U.S. Appl. No. 13/649,203 dated May 13, 2014.
European Search Report for Application No. 12188224 dated Mar. 12, 2014.

* cited by examiner (I - I)

(II)

(III - III)

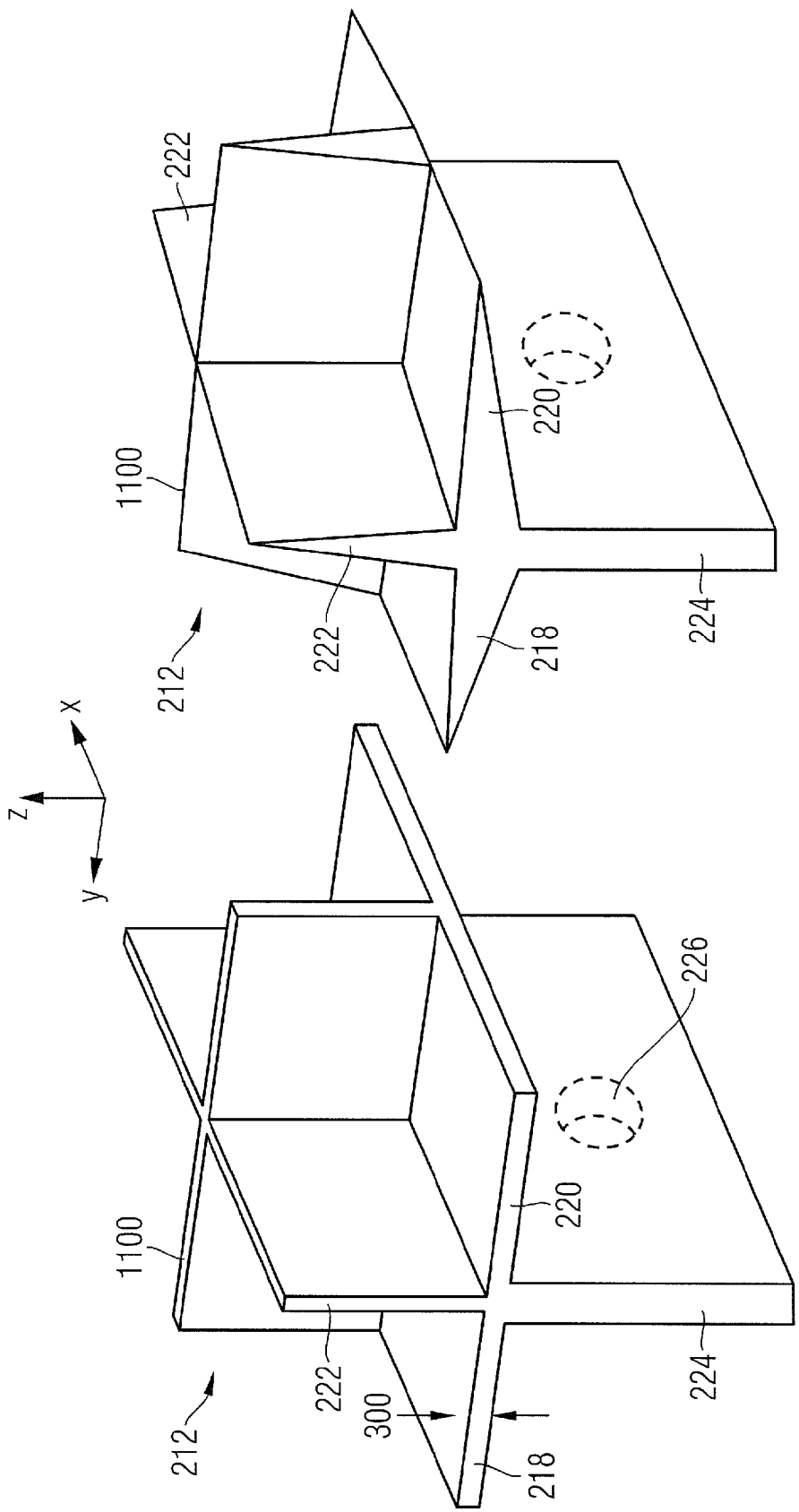

STRUCTURAL ARRANGEMENT, AIRCRAFT OR SPACECRAFT AND METHOD

CROSS-REFERENCE TO RELATED APPLICATIONS

This application claims the benefit of and priority to U.S. Provisional Application No. 61/546,764, filed on Oct. 13, 2011, and German patent application No. 10 2011 084 472.4, filed Oct. 13, 2011, the entire disclosures of which are incorporated herein by reference.

FIELD OF THE INVENTION

The present invention relates to a structural arrangement, to an aircraft or spacecraft and to a method for producing a structural arrangement.

BACKGROUND OF THE INVENTION

FIG. 1 shows a detail of an aircraft which is generally denoted by reference numeral 100. The aircraft 100 comprises a landing flap 102. FIG. 1 shows the landing flap 102 when viewed in the direction opposite to the flight direction of the aircraft 100. The landing flap 102 is shown once by a dashed line, this view corresponding to the unloaded state of the landing flap. The landing flap 102 is also shown by way of a solid line, this corresponding to the deformed state of the landing flap owing to air loads 104, which is shown in a much exaggerated manner. The landing flap 102 is connected by means of two flap carriages 106, 108 to a wing 110, which is indicated merely schematically. The flap carriages 106, 108 make it possible to adjust the landing flap 102 in relation to the wing 110 from a flight position into a take-off or landing position, the take-off and landing position serving to increase the lift. In the span direction, that is to say from left to right in FIG. 1, one flap carriage 106 is designed as a fixed bearing and the other flap carriage 108 is designed as a loose bearing. The flap carriages 106, 108 are each connected to the landing flap 102 via an eye-bolt connection 112.

It is known to design the eye of a respective eye-bolt connection 112 as a fitting which is made of metal and connected, in particular riveted, to the landing flap 102. For example, publication DE 10 2007 011 613 A1 shows a metal fitting for load introduction.

There is an increasing need also to produce load introduction elements, for example the above-described eye of the eye-bolt connection 112, from fibre composite materials, for example carbon-fibre-reinforced plastics material (CFRP), in order to reduce further weight and assembly costs. Publication US 2010/0148008 A1 describes a load introduction element of this type made of fibre composite material.

In addition, German patent application DE 10 2009 043 103 A1 describes a fibre composite structure comprising at least three fibre composite arms extending from a branching point.

Further, European patent application EP 1 627 726 A1 describes a composite fibre compressor wheel.

SUMMARY OF THE INVENTION

An idea of the invention is to provide an improved, fibre-compatible approach to introducing loads, in particular into box-like structures, for example landing flaps.

According to the invention, the following is provided:
a structural arrangement, in particular for an aircraft or spacecraft, comprising a box structure, comprising a first fibre portion which extends in a first plane, comprising a second fibre portion which extends in a second plane which intersects the first plane, the first and the second fibre portion being interconnected at a crossing point thereof, the first fibre portion comprising a first portion on one side of the crossing point and a second portion on the other side of the crossing point, the first portion of the first fibre portion being connected to a first portion of the box structure and the second portion of the first fibre portion being connected to a second portion of the box structure, the second fibre portion forming, on one side of the crossing point, an inner web inside the box structure and, on the other side of the crossing point, an outer web outside the box structure, comprising a supporting element which is connected to the inner web, and comprising an attachment point for introduction of a first load into the outer web, the second fibre portion guiding the first load which is introduced at the attachment point from the attachment point into the supporting element, and the first fibre portion simultaneously transferring a second load between the first and the second portion of the box structure;

in addition, an aircraft or spacecraft comprising the structural arrangement according to the invention;

in addition, a method for producing a structural arrangement, in particular the structural arrangement according to any of the preceding claims, in particular in the aviation or aerospace industry, comprising the following steps: providing a box structure, providing a first fibre portion which extends in a first plane, providing a second fibre portion which extends in a second plane which intersects the first plane, interconnecting the first and the second fibre portion at a crossing point thereof, connecting a first portion of the first fibre portion on one side of the crossing point to a first portion of the box structure and connecting a second portion of the first fibre portion on the other side of the crossing point to a second portion of the box structure, the second fibre portion forming, on one side of the crossing point, an inner web inside the box structure and, on the other side of the crossing point, an outer web outside the box structure, connecting the inner web to a supporting element and providing an attachment point for introduction of a first load into the outer web, the second fibre portion guiding the first load which is introduced at the attachment point from the attachment point into the supporting element, and the first fibre portion simultaneously transferring a second load between the first and the second portion of the box structure.

The idea on which the present invention is based is that the second fibre portion guides a first load from the attachment point into the supporting element, and the first fibre portion simultaneously transfers a second load between the first and the second portion of the box structure. As a result, load paths which are substantially mutually independent can be provided. The first load path passes through the crossing point in the first plane and the second load path passes through the crossing point in the second plane, without the load paths influencing each other significantly. This is advantageous particularly with regard to application in the landing flap described at the outset. The loads acting in the eye are guided in the second plane into a supporting element, for example into a rib connected to the box structure, while bending loads to which the landing flap is subjected in operation owing to the active air loads are transferred in the first plane (in particular inside the outer wall of the box structure) through the crossing point between the first and the second portion of the box structure. This results in a high loading capacity of the attachment point, it being possible to avoid in particular peeling of the eye including corresponding fibre layers.

The application of the structural arrangement is not limited to the aviation or aerospace industry. For example, said arrangement can also be applied in bridges, multi-story buildings, masts, roofs or other plane load-bearing structures.

In the present case, "fibre portion" always refers to a portion of a single fibre.

In the present case, the feature that "the first and the second fibre portion are interconnected at a crossing point thereof" includes different cases.

Said portions can be two fibre portions of different fibres which are interconnected, for example adhesively bonded or sewn to each other or interwoven, at the crossing point.

Alternatively, the first and the second fibre portion each form part of the same fibre, which extends in both the first plane and the second plane. This extension in the first and the second plane can be achieved for example by 3D weaving, as will be described in detail below.

Advantageous configurations of the invention are set out in the dependent claims.

Obviously, a plurality of first and second fibre portions can be provided.

The box structure is preferably substantially closed. "Substantially closed" means that the box structure has no or only comparatively small openings in its outer walls.

According to a further configuration of the structural arrangement according to the invention, the first and the second fibre portion are part of the same fibre. By this is meant the above-described configuration in which the fibre comprising the first and the second fibre portion extends in the first and the second plane. This results in advantages in terms of production when constructing a corresponding fibre preform. The common fibre is also anchored better than two individual fibres and therefore has a higher loading capacity.

According to a further configuration of the structural arrangement according to the invention, the first and the second fibre portion are part of different fibres. By this is meant the above-described configuration in which the different fibres are interconnected at the crossing point.

According to a further configuration of the structural arrangement according to the invention, the fibre is interwoven with other fibres in two and a half or three dimensions. The structural arrangement or a corresponding fibre preform can be produced easily as a result. Weaving in three dimensions is basically known, as described for example in U.S. Pat. No. 3,818,951. The terms "2D weaving" (that is to say, weaving in two dimensions), "2.5D weaving" (that is to say, weaving in two and a half dimensions) and "3D weaving" (that is to say, weaving in three dimensions) are distinguished from each other below.

2D weaving denotes the process of producing a planar, textile product from filamentary or fibrous semi-finished material. The finished product is referred to as a "woven fabric". Two groups of threads are involved, which are oriented at right angles to each other, substantially in one plane (for example XY plane): what are known as the "warp threads" and, substantially at right angles thereto, what are known as the "weft threads". The warp threads are all arranged mutually parallel for example in the Y direction and are tensioned by a suitable device. In addition, in 2D weaving the warp threads are in turn divided into two groups, the first, third, fifth, etc. thread being assigned to a warp thread group A and the second, fourth, sixth, etc. thread being assigned to a second warp thread group B. The warp threads of one warp thread group A, B in turn are fed through a device (in particular a frame, which is known as the "heald frame", with the "healds" contained therein), which makes it possible to move all the threads of one warp thread group A, B up and down together in a direction Z oriented perpendicular to the XY plane. The movements of the two warp thread groups A, B are positively coupled in opposite directions. If the warp threads of warp thread group A are moved downwards, the threads of warp thread group B are moved upwards and vice versa. Owing to the movement in opposite directions of the two warp thread groups in the Z direction, the warp threads of each warp thread group A, B form an upper and a lower limit of an intermediate space between the warp threads, which is referred to as a "shed". The movement of each of the warp thread groups is calculated such that the shed is large enough for a weft thread to be guided through the shed substantially in the X direction by means of a further device. This can be done for example manually by what is known as a "shuttle" or in a mechanised manner by a gripper or an air or water jet. After insertion of the weft thread, the positions of the warp thread groups A, B are switched. The warp thread group which forms the lower limit of the shed is moved upwards and the upper warp thread group is moved downwards. When the warp threads pass through the XY plane, the weft thread is fixed by the warp threads and a new shed is opened. The next weft thread is introduced into this shed. The woven fabric is produced step by step by repeating this process. The length of the woven fabric in the Y direction is limited only by the maximum possible length of the warp threads and is typically 100 m. The width of the woven fabric is limited by the width of the loom and the devices thereof and is typically 1-2 m. The woven fabric produced according to the above-described process is characterised in that a weft thread passes over precisely one and then under precisely one warp thread. The same applies vice versa for the warp threads in relation to the weft threads. This type of woven fabric formation is referred to as "plain weave" or "1:1 weave". Other weave types, for example twill weave or satin weave, are also made possible by grouping the warp threads differently or increasing the number of warp thread groups by introducing further heald frames. The greatest possible flexibility in 2D weaving is achieved when each individual warp thread or the heald through which it is passed can be controlled individually. Looms equipped in this manner are called Jacquard machines and allow very complex weaves which can also be changed for each new weft thread.

What is known as "2.5D weaving" is a modification of 2D weaving using a Jacquard machine. In this case, woven two-dimensional formations are produced which can be reshaped into a three-dimensional formation once the weaving is complete. The ability of Jacquard machines to control individual healds individually is used for this purpose. In contrast to 2D weaving, where only precisely one shed is formed, in 2.5D weaving a plurality of sheds is produced one on top of another, into each of which a separate weft thread is introduced. In this way, two or more woven parts are in practice produced in parallel, one on top of another and separately from each other for the time being, on a loom. By controlling the healds in a suitable manner, it is possible to connect the upper and lower woven parts which thus far have been separate. Let us assume that four warp thread groups have been formed in a correspondingly equipped loom (Jacquard machine): two upper warp thread groups which form the upper sheds, and two lower warp thread groups which form the lower sheds. Once an upper and a lower woven part having a given length in the Y direction (see for example FIG. 6B) have been woven by means of the upper and lower sheds, the two upper warp thread groups are guided downwards. The two lower warp thread groups are accordingly guided upwards. This produces a common crossing region of the upper and the lower woven part along the X direction. Weaving is then continued. However, the warp threads which before the crossing point formed the upper woven part now extend in the lower woven part, and the formerly lower warp threads extend in the upper woven part. As 2D weaving is continued, further crossing regions of the two woven parts are produced by the switching of lower and upper warp thread groups. A two-ply woven fabric is produced by interconnecting the layers in the crossing regions. After completion of the weaving process, the multiple layers are severed between the crossing regions in the weft direction (X direction). A cross-shaped arrangement of the woven parts in relation to each other is produced by opening the woven parts which lie one on top of the other (see for example FIG. 6A-7F).

In the case of both 2D and 2.5D weaving, weaving takes place in a plane XY and in planes XY1, XY2, etc. which are parallel thereto. This means that the two groups of threads which are involved, warp threads and weft threads, extend in the XY plane, if the undulations in the Z direction as a result of the crossing over of warp and weft are disregarded. This is not the case in 3D weaving.

In contrast to 2D weaving, in 3D weaving fibres can be woven directly in three spatial directions. At the same time there is even greater flexibility with regard to the number and arrangement of warp and weft threads. In typical 3D weaving machines the warp threads extend in the Z direction. The healds through which the warp threads extend can be arranged side by side in a row, as in 2D weaving, or in any desired arrangement, for example in a square or cross shape, depending on what cross-sectional shape of the subsequent 3D woven fabric is desired. There can be one or more weft threads. The weft threads are provided on spools which are in turn mounted on what are known as "bobbins". The bobbins can be passed around the warp threads and/or other weft threads in a matrix of freely programmable paths in the XY plane, such that even very complex geometries and weaves can be produced. The interwoven weft threads are oriented substantially in the XY plane. The distinguishing feature in relation to 2D and 2.5D weaving is the orientation of the weft threads in the XY plane and of the warp threads in the Z direction during weaving. In 2D weaving the warp threads and weft threads are oriented only in the XY plane. In 2.5D weaving the warp threads and weft threads also extend substantially in the XY plane during weaving and are reoriented into the third spatial direction Z only after weaving, by reshaping or opening the woven structure.

According to a further configuration, the different fibres are interwoven with other fibres in two and a half dimensions. If the first and the second fibre portion are part of different fibres, 2.5D weaving for example can be used. Cost-effective weaving can thus be achieved.

According to a further configuration of the structural arrangement according to the invention, the different fibres are sewn together, interwoven or interlaced by means of fibres and/or the different fibres are adhesively bonded to each other in particular by means of a thermoplastic strand, a thread coated with thermoplastic material, or an adhesive tape. The different fibres can easily be interconnected for example by sewing or adhesive bonding.

According to a further configuration of the structural arrangement according to the invention, the first and/or the second portion of the first fibre portion is integrated, in particular glued, into the first and/or the second portion of the box structure, and/or the inner web is integrated, in particular glued, into the supporting element, the supporting element preferably being designed as a rib, transverse web or spar and/or being connected to the box structure. "Integrated" means in particular that the first and/or the second portion of the first fibre portion extends inside a wall of the box structure, at least in portions. For example, the first or the second portion of the first fibre portion can be integrated into the wall of the box structure in the dry state, whereupon the wall and the first and/or the second portion of the first fibre portion are infiltrated with a matrix. According to an alternative embodiment, the first and/or the second portion of the first fibre portion and the wall of the box structure can each be provided as a prepreg material, whereupon the first and/or the second portion of the first fibre portion is integrated into the wet wall in the wet state. According to another alternative embodiment, the first and/or the second portion of the first fibre portion is integrated into the wall of the box structure, which wall is as yet uncured or cured only in part, in the cured state (in this connection, "cured" relates to a corresponding matrix between the respective fibre portions). As another alternative, the first and/or the second portion of the first fibre portion is integrated into the cured wall of the box structure in the uncured or only partially cured state. By means of the above-described measures it is possible to achieve a good connection between the first and/or the second portion of the first fibre portion and the wall of the box structure. The above comments apply accordingly for the inner web and the integration thereof into corresponding ribs, transverse webs or spars. The one or more ribs (or spars) form part of the structural arrangement and can absorb loads from the inner web or introduce loads into said web. In the present case, "ribs" and "spars" refer to structural elements which increase dimensional stability. Ribs support in particular the aerodynamic profile of lift-generating surfaces (for example wings, control surfaces, tail unit fins) and preferably extend parallel to the flight or oncoming flow direction. In contrast thereto, spars preferably extend substantially in the span direction and their main function is to introduce bending loads from the lift-generating surface to force-introduction ribs (rib having a force introduction point) or directly into force introduction points, for example into the attachment point in the present case (which is designed for example as an eye). Ribs and spars preferably structurally interconnect the upper and the lower shell of the lift-generating surfaces.

According to a further configuration of the structural arrangement according to the invention, the first and/or the second portion, the inner and/or the outer web tapers in a direction away from the crossing point. As a result, the connection formed by the first and/or the second portion and the wall of the box structure or the connection between the inner and/or the outer web and corresponding ribs or spars has an even higher loading capacity.

According to a further configuration of the structural arrangement according to the invention, the attachment point is designed as an eye, metal fitting, rivet field, bonded joint and/or weld. An attachment point of this type is easy to produce and offers versatile connection options.

According to a further configuration of the structural arrangement according to the invention, the eye is designed for mounting a control member, in particular a flap carriage, a lever and/or a coupling rod. In this case, the eye preferably extends transversely through the outer web.

According to a further configuration of the structural arrangement according to the invention, the first and the second plane are substantially perpendicular to each other. "Substantially" means an angular range between the first and the second plane of between 45 and 135°, preferably 80 and 100°, more preferably 85 and 95°.

According to a further configuration of the structural arrangement according to the invention, the first and/or the second fibre portion is embedded in a matrix. The matrix can be an epoxy (resin) matrix or thermoplastic matrix.

According to a further configuration of the vehicle according to the invention, a control flap comprises the structural arrangement. In the present case, "control flap" means in particular a flap, a control surface or a spoiler. "Control flap" preferably means an actively moved control flap. However, it may also be a control flap which is moved passively (without supplying external electric, hydraulic or pneumatic energy). An aerofoil or control surface, for example a rudder unit or a horizontal tail plane, can also comprise the structural arrangement. Passenger doors, freight loading gates and connections for floors or struts can also comprise the structural arrangement.

According to a further configuration of the vehicle according to the invention, an adjusting member arranged at an aerofoil or control surface acts on the eye of the structural arrangement. In relation to the vehicle, aerofoil or control surface means a stationary or substantially stationary aerofoil or control surface (for example a trimmable horizontal tail plane). In particular, "aerofoil or control surface" means the stationary part of a wing, horizontal tail plane or rudder unit of an aircraft.

According to a further configuration of the vehicle according to the invention, the adjusting member is designed as a flap carriage which on one hand is displaceably arranged at the aerofoil and on the other hand is in engagement with the eye of the structural arrangement. The second fibre portion of the structural arrangement transfers the forces introduced into the eye from the adjusting member, in particular the flap carriage, to the inner web and the two portions of the structural arrangement.

BRIEF DESCRIPTION OF THE DRAWINGS

The invention is described in greater detail in the following by way of embodiments, with reference to the appended figures of the drawings, in which:

FIG. 11A shows a further variation on the embodiment according to FIG. 3A; and FIG. 11B shows a variation on the embodiment according to FIG. 11A.

In the figures, like reference numerals denote like or functionally like components, unless indicated otherwise.

DETAILED DESCRIPTION OF THE INVENTION

Figure 2:
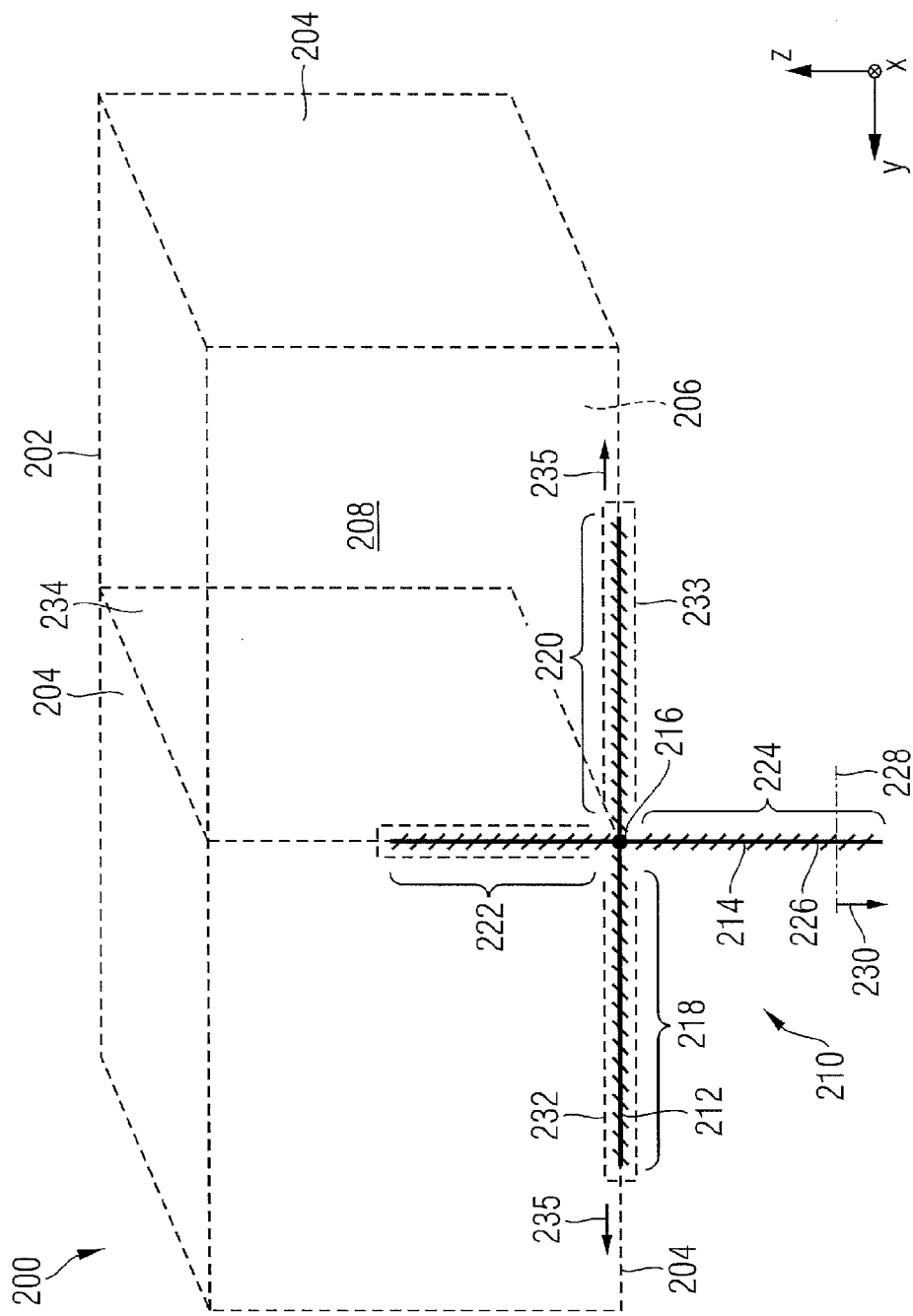
FIG. 2 is a schematic view of a structural arrangement according to one embodiment of the present invention.

FIG. 2 is a partial perspective view of a structural arrangement 200 according to one embodiment of the present invention which is kept comparatively general.

Figure 1:
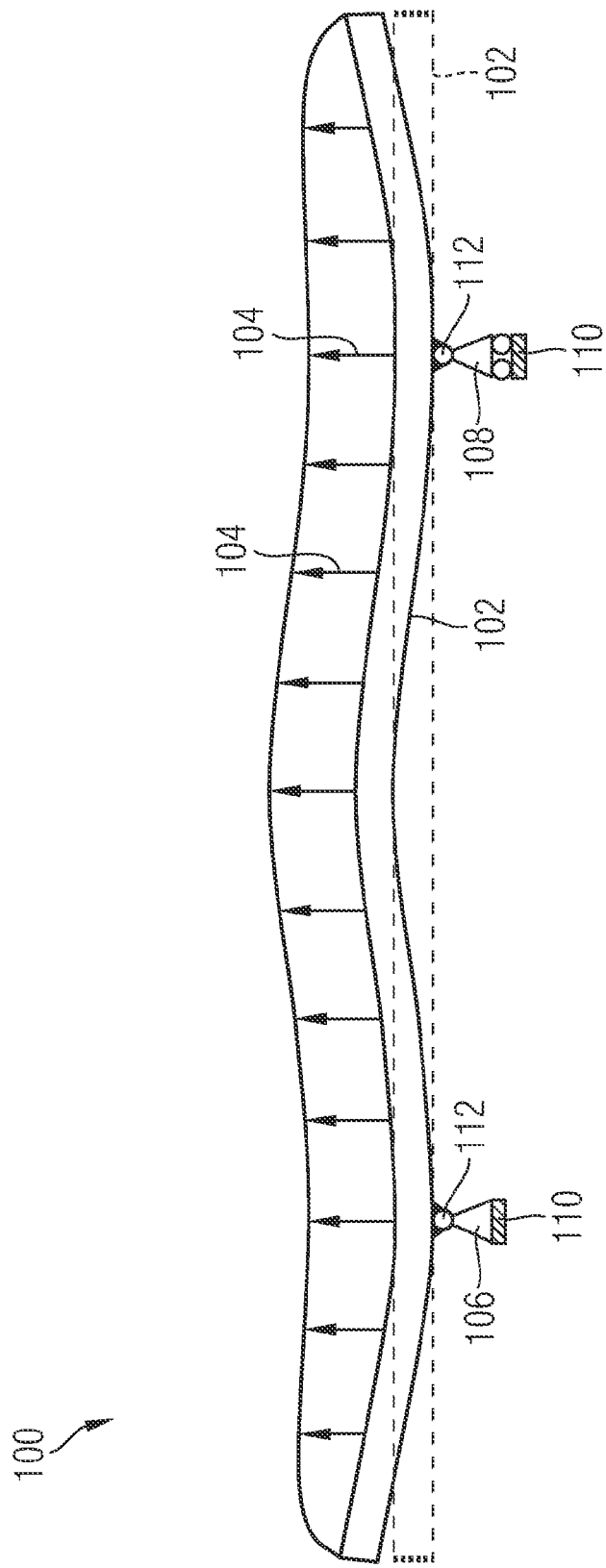
FIG. 1 shows a detail of an aircraft.

The structural arrangement 200 is for example part of the landing flap 102 shown in FIG. 1 and thus part of the aircraft 100.

In the present case, the three mutually orthogonal spatial directions are denoted X, Y and Z. This is merely to facilitate better understanding of the spatial arrangement of the various components in relation to each other. In the case of the landing flap 102, X denotes the oncoming flow direction, Y denotes the span direction and Z denotes the vertical direction.

The structural arrangement 200 comprises a substantially closed box structure 202 which is shown by dashed lines in FIG. 2. "Substantially closed" means that the box structure 202 has no or only comparatively small openings in its outer walls 204. The front outer wall 206 is transparent in FIG. 2 in order for it to be possible to see the interior 208 of the box structure 202.

The structural arrangement 200 further comprises a fibre construct 210 which is made up of first and second fibre portions 212, 214, only a single first fibre portion 212 of this type and a single second fibre portion 214 of this type being shown in the YZ plane in order to facilitate better understanding. As many fibre portions 212 and 214 of this type as desired can be arranged side by side in the X direction in the structural arrangement 200. To facilitate better differentiation, the first and the second fibre portion 212, 214 are distinguished by short dashes in opposite directions. A respective fibre portion 212 extends for example in a horizontal XY plane, while a respective second fibre portion 214 extends for example in a vertical XZ plane. According to the embodiment, a respective first fibre portion 212 and a respective second fibre portion 214 thus extend perpendicular to each other.

Figure 5:
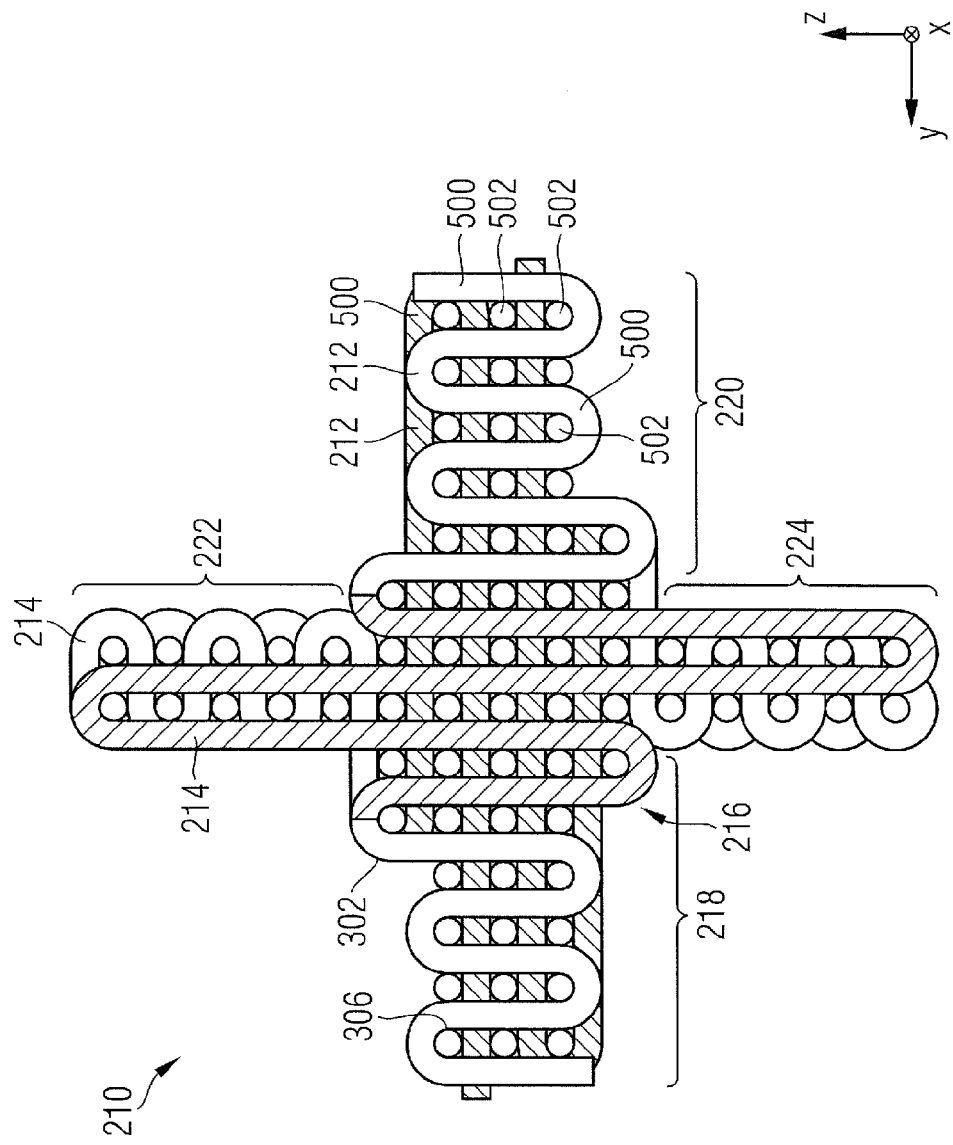
FIG. 5 is a partial sectional view from FIG. 2 in the region of a crossing point of first and second fibre portions which are part of the same fibre, which fibre is three-dimensionally interwoven with other fibres.

A respective first fibre portion 212 and a respective second fibre portion 214 are interconnected at a crossing point 216. This can be achieved for example in that the first and second fibre portions 212, 214 are adhesively bonded to each other, are wound around each other or are coupled to each other by means of a further fibre portion at the crossing point 216. In particular, the fibre portions 212, 214 can be interwoven (2.5D weaving, see FIGS. 6A, 7D and 7F) or sewn together (see FIG. 10A to 10C) at the crossing point. A further variant provides that the first and second fibre portions 212, 214 are part of the same fibre, as shown in FIG. 5.

Returning now to FIG. 2, this figure shows that a respective first fibre portion 212 comprises a first and a second portion 218, 220, the portions 218, 220 being connected to the lower outer wall 204 of the box structure 202, which wall extends in the XY plane. To be more precise, the first portion 218 of the first fibre portion 212 is integrated, in particular glued, into a first portion 232 of the outer wall 204, and the second portion 220 of the first fibre portion 212 is integrated, in particular glued, into a second portion 233 of the outer wall 204. For this purpose, the portions 232, 233 of the outer wall 204 are each fork-shaped. However, it is also conceivable for the portions 218, 220 to be fixed to or in the outer wall 204 of the box structure 202 in another manner.

A respective second portion 214 forms an inner web 222, which projects upwards into the interior 208 of the box structure 202, and an outer web 224, which extends downwards outside the box structure 202. The inner web 222 is connected to a supporting element 234 of the structural arrangement 200. The supporting element 234 is designed for example as a rib which is connected to the box structure 202. The supporting element 234 can also be designed as a spar or transverse web, for example. The inner web 222 is preferably integrated, in particular glued, into the supporting element 234.

The outer web 224 comprises an attachment point 226 for introduction of a first load 230 into the outer web 224. The attachment point 226 is designed in particular as an eye, but can also be designed as another structural load transfer member, for example a riveted joint or bonded joint. A corresponding axis of the eye 226 is denoted by reference numeral 228.

The second fibre portion 214 guides the first load 230 introduced at the attachment point 226 from the attachment point 226 into the supporting element 234. The first fibre portion 212 simultaneously transfers a second load 235 between the first and the second portion 232, 233 of the box structure 202. Thus, two substantially mutually independent load paths are provided. For example, bending loads 235 in the outer wall 204 are guided through the crossing point 216 by means of the first fibre portions 212, while—substantially unaffected thereby—the retaining forces 230 introduced at the eye 226 by means of the flap carriages 106, 108 are guided into the supporting element 234. Peeling of the eye 226 is effectively prevented in spite of the fibre composite construction.

The portions 218, 220 can be glued into the outer wall 204 of the box structure 202 in various ways. The completely or partially cured portions 218, 220 can be cured together with the wet outer wall 204. In addition, the completely or partially cured portions 218, 220 can be structurally adhesively bonded to the completely or partially cured outer wall 204. In addition, the dry portions 218, 220 can be infiltrated and cured together with the dry outer wall 204. The wet portions 218, 220 (prepreg) can also be adhesively bonded to the wet outer wall 204.

In addition, the inner web 222 is preferably also glued into the rib 234 (or a spar or transverse web) in one of the ways described above for the portions 218, 220. However, it is again also conceivable for the inner web 222 to be attached to the rib 234 in another way, for example by bolting or screwing.

In one embodiment, the fibre construct 210 is provided with a resin matrix which is cured before or after integration of the fibre construct 210 into the box structure 202. In particular, joint impregnation of the box structure 202 (which in this case is likewise designed as a fibre composite material) and of the fibre construct 210 with the resin matrix in one process step is conceivable.

In addition, the fibre construct 210 can be produced in one piece with the box structure 202, in particular by means of 2.5D or 3D weaving.

Figure 3A:
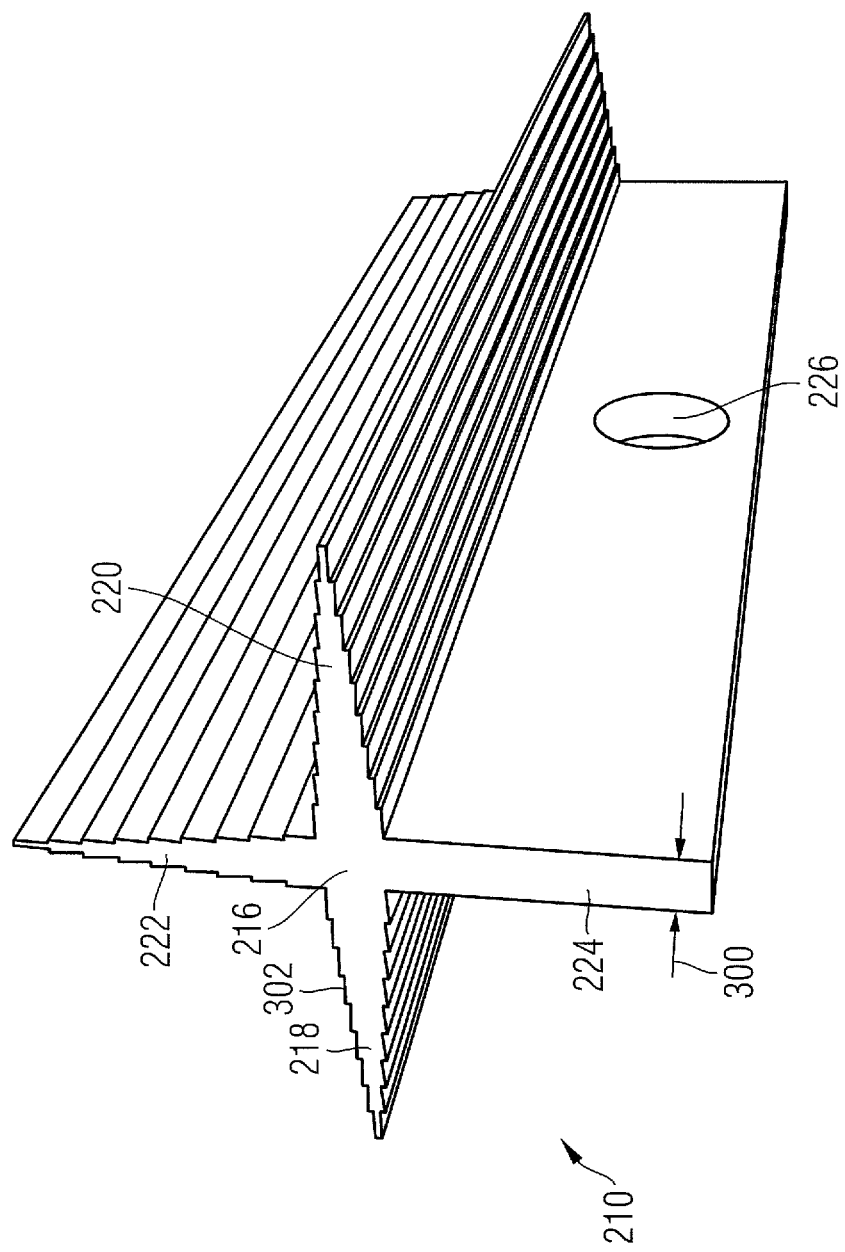
FIG. 3A is a perspective view of first and second fibre portions from FIG. 2.

FIG. 3A is a perspective view of the fibre construct 210 from FIG. 2 in one possible configuration which can be achieved dry, that is to say without matrix, wet, that is to say preimpregnated with matrix, or even in the cured state. The individual fibres cannot be seen owing to the simplified representation.

FIG. 3A shows the cross-shaped cross-section, already shown in FIG. 2, of the fibre construct 210. FIG. 3A also shows that the first portion 218, the second portion 220 and the inner web 222 can taper away from the crossing point 216. In contrast, according to the embodiment the outer web 224 has a constant thickness 300. FIG. 3A also shows the attachment point formed as an eye 226.

The first portion 218, the second portion 220 and the inner web 222 preferably each taper in steps. A step of this type is denoted by reference numeral 302 by way of example. The steplike construction is produced in that the first and second fibre portions 212, 214 are trimmed in steps or woven accordingly (see FIG. 5).

Figure 3B:
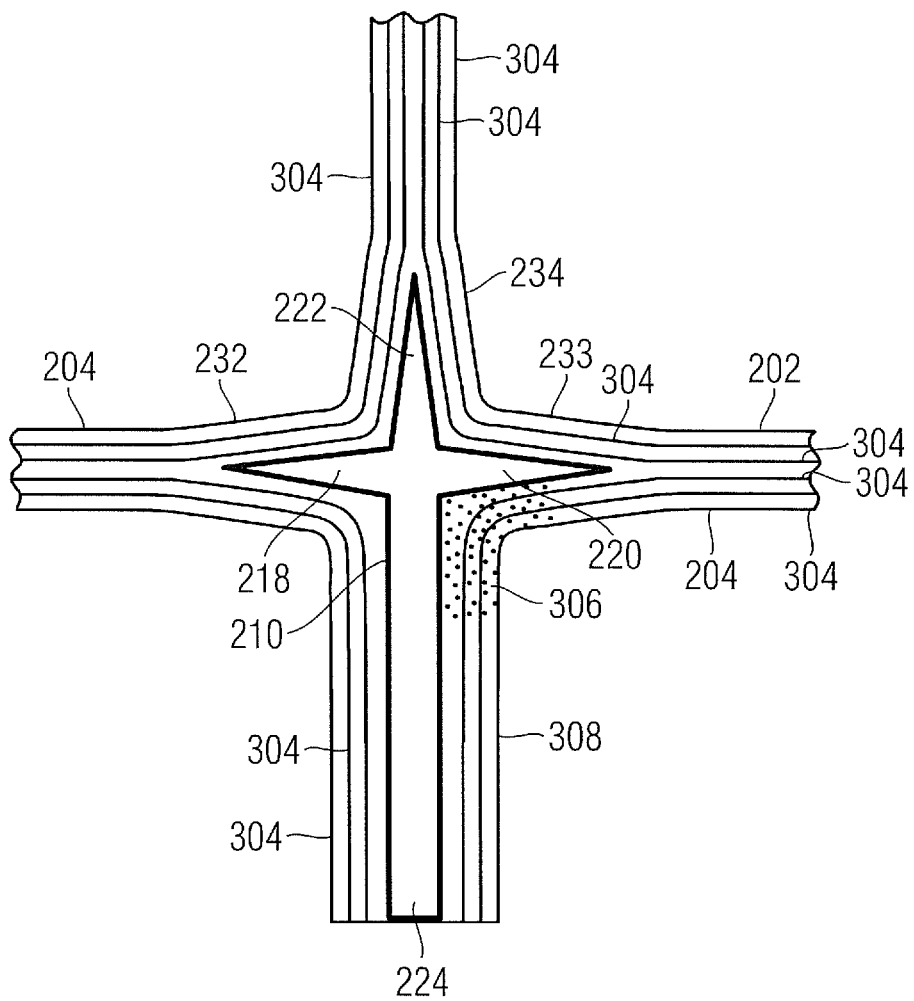
FIG. 3B is a cross-sectional view of the first and second fibre portions from FIG. 3A when integrated into a box structure or ribs.

FIG. 3B is a sectional view of the integration of the fibre construct 210 from FIG. 3A into the box structure 202. The portions 218, 220 each extend into the fork-shaped portions 232, 233 of the outer wall 204. To be more precise, the portions 218, 220 extend between a plurality of fibre layers 304 which form the outer wall 204 and the fork-shaped portions 232, 233. The inner web 222 extends into the inner rib 234, which also extends in a fork-shaped manner for this purpose and comprises fibre layers 304. The outer web 224 extends into an outer rib 308 which comprises fibre layers 304 and according to the embodiment ends with the web 224.

According to the embodiment, the fibre layers 304 form the outer wall 204, the fork-shaped portions 232, 233 and the ribs 234, 308. For this purpose the fibre layers 304 are arranged in the form of angles on the fibre construct 210.

A resin matrix 306 is shown by dots in only one region by way of example. The resin matrix 306 fills all the free spaces between the fibre construct 210 and the layers 304 as well as intermediate spaces between the layers 304.

As can be seen from FIG. 3B, the outer web 224, viewed in cross-section, is designed to be longer than the portions 218, 220 and the inner web 222, which are preferably designed to be approximately equal in length. As a result, the eye 226 can be spaced comparatively far apart from the portions 218, 220 and thus from the outer wall 204 of the box structure 202.

Figure 4A:
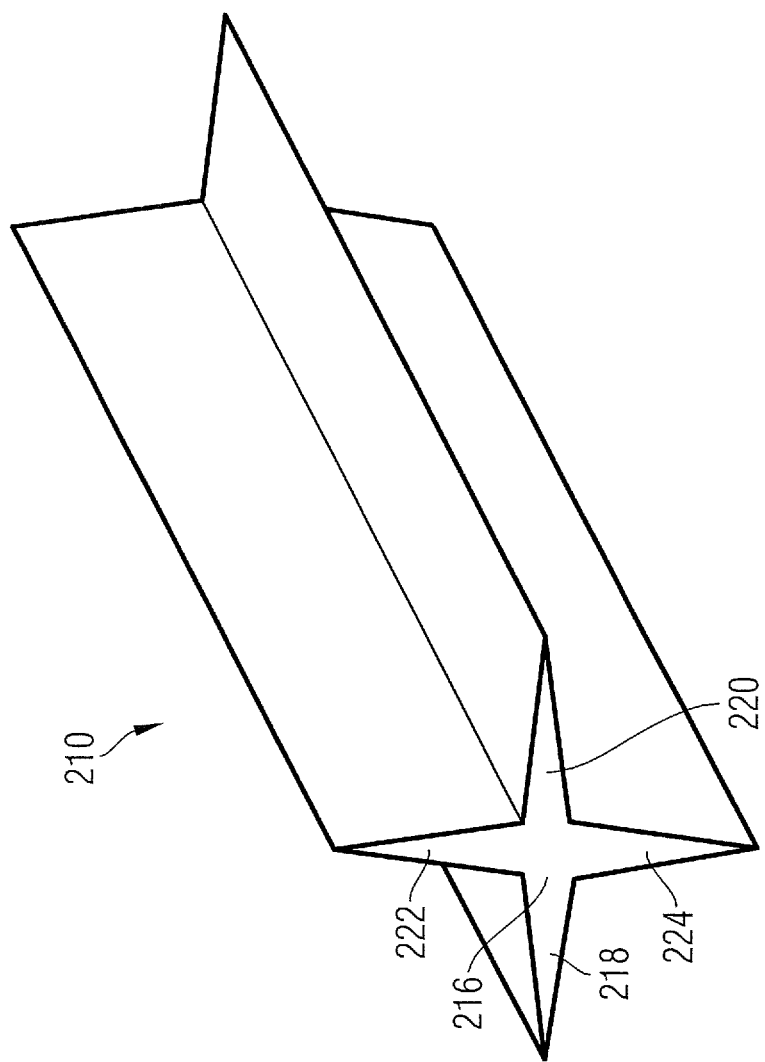
FIG. 4A shows a variation on the embodiment according to FIG. 3A.
Figure 4B:
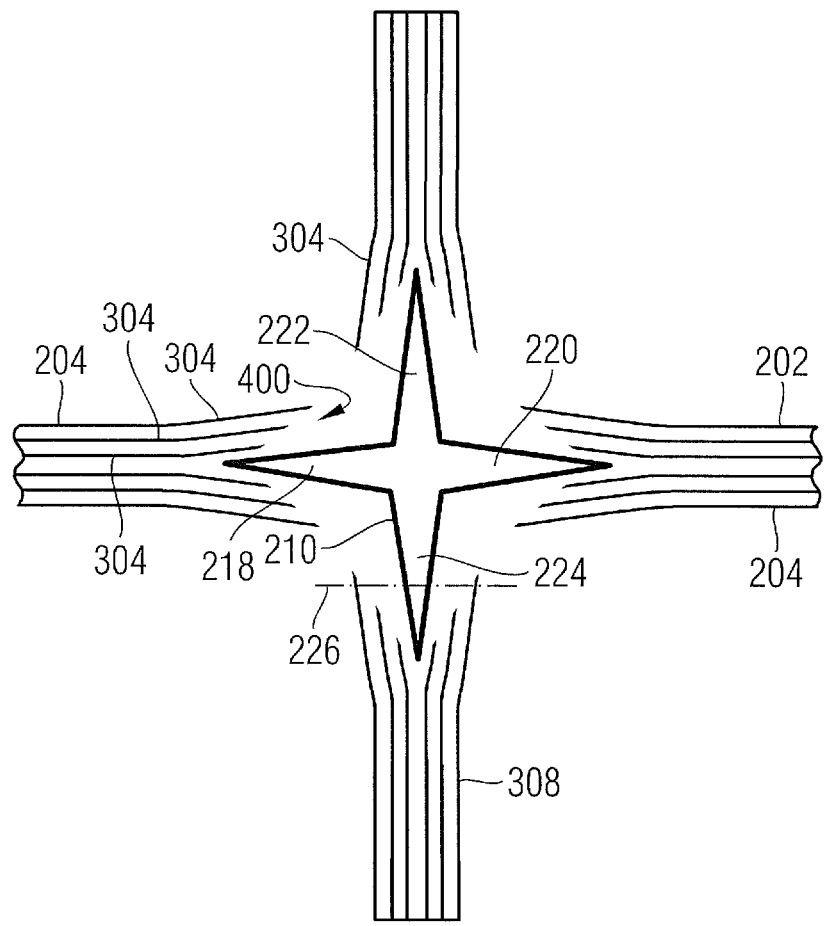
FIG. 4B is a cross-sectional view of the first and second fibre portions from FIG. 4A when integrated into a box structure or ribs.

FIGS. 4A and 4B show the views from FIGS. 3A and 3B, with the difference that in the embodiment according to FIGS. 4A and 4B the outer web 224 has the same length as the portions 218, 220 and the inner web 222. In addition, the outer web 224 tapers in a direction away from the crossing point, in the same way as the portions 218, 220 and the inner web 222. The outer rib 308 widens out in a fork-shaped manner in order to accommodate the outer web 224. In addition, the fibre layers 304 are trimmed in steps. A step of this type is denoted by reference numeral 400. As a result, a connection having a particularly high loading capacity of the fibre layers 304 to the fibre construct 210 can be achieved.

FIG. 5, which was discussed at the outset, shows an exemplary section in the region of the crossing point 216 from FIG. 2.

FIG. 5 shows how it is possible for respective first and second fibre portions 212, 214 to be formed as part of a single fibre 500. For this purpose, the fibres 500 are three-dimensionally interwoven with fibres 502.

By means of 3D weaving it is thus easy to produce a fibre construct 210 in which a respective fibre 500 forms the portions 218, 220 and the webs 222, 224.

After completion of the weaving process, the fibre construct 210 is infiltrated by a resin matrix 306 which fills all the intermediate spaces between the fibres 500, 502.

Figure 6A:
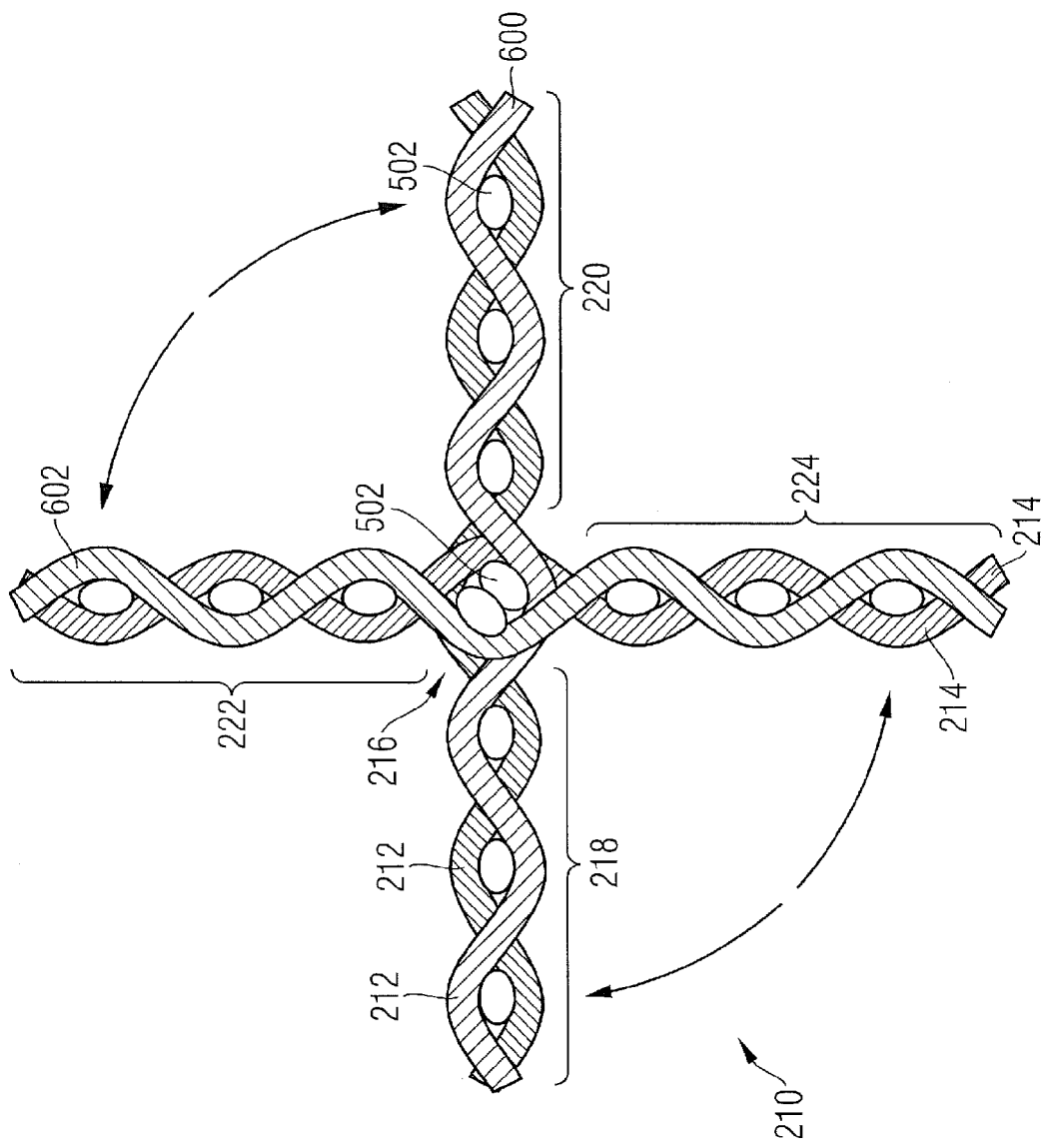
FIG. 6A shows a variation on the embodiment according to FIG. 5, the fibre being interwoven with other fibres in two and a half dimensions.

In contrast to FIG. 5, FIG. 6A shows a fibre construct 210 which has been produced by means of 2.5D weaving. In this case, the first and the second fibre portion 212, 214 are formed of different fibres 600, 602, which form what are known as warp threads and are interwoven in two and a half dimensions with fibres 502 which form what are known as weft threads. The fibres 600 and 602 each wind around the same fibres 502 at the crossing point 216, whereby the fibres 600 and 602 and thus the first and second fibre portions 212, 214 are interconnected.

Figure 6B:
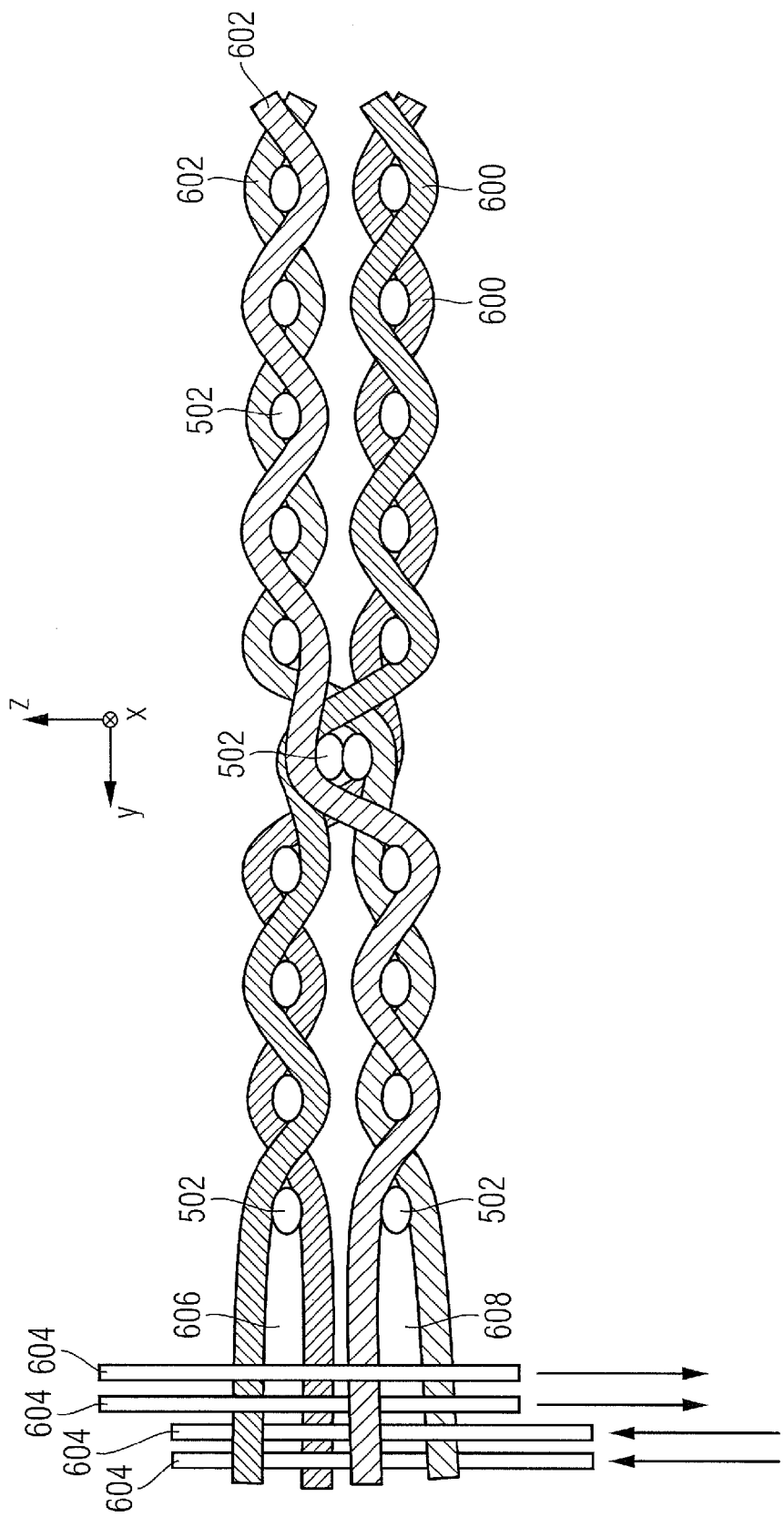
FIG. 6B shows a state preceding the state in FIG. 6A.

FIG. 6B shows how the fibres 502, 600, 602, located substantially in one plane, are interwoven. For this purpose, the fibres 600, 602 (warp threads) are each moved in the vertical direction Z (see arrows) by means of a heald 604 of a Jacquard machine, in order thereby to form an upper shed 606 and a lower shed 608 through which the fibres 502 (weft threads) are moved.

After completion of the woven fabric, the fibres 602, together with the fibres 502 respectively allocated thereto, are pivoted upwards or downwards (that is to say, reshaped), as indicated by corresponding arrows in FIG. 6A, in order to form the fibre construct 210.

Figure 7A:
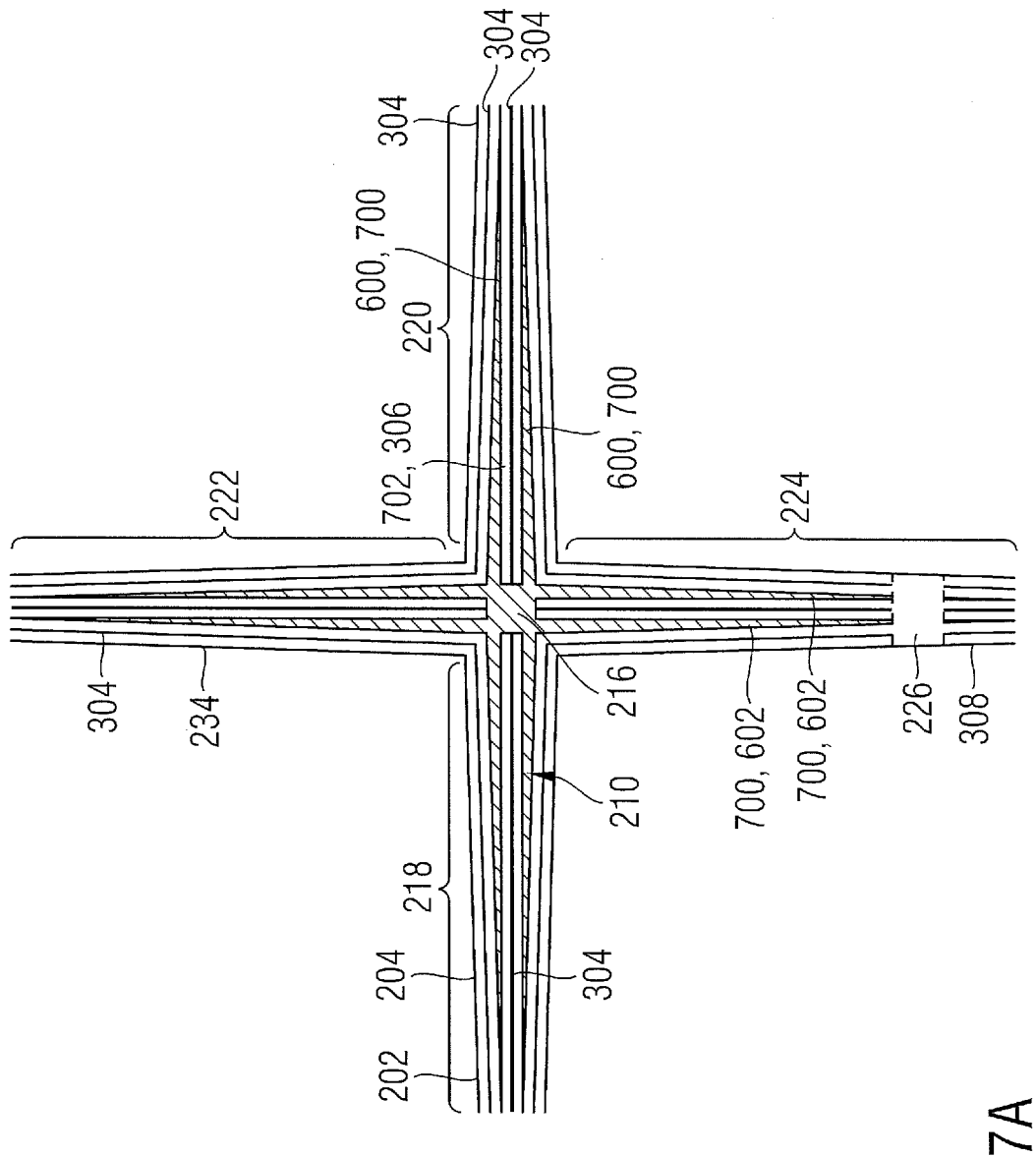
FIG. 7A shows a variation on the embodiment according to FIG. 6A.

FIG. 7A shows a fibre construct 210 which is also produced by means of 2.5D weaving and in contrast to FIG. 6A has already been integrated into the box structure 202, as described above for example with reference to FIG. 3B.

In addition, in the case of the fibre construct 210 according to FIG. 7A, the portions 218, 220 and the webs 222, 224 are each preferably U-shaped, comprising two arms 700. Layers 304 are arranged on, under and in an intermediate space 702 between the arms 600. The arms 600 can each taper away from the crossing point 216, for example until they reach a thickness which corresponds to the thickness of a respective layer 304.

The intermediate space 702 can obviously also be infiltrated by the matrix 306.

Figure 7C:
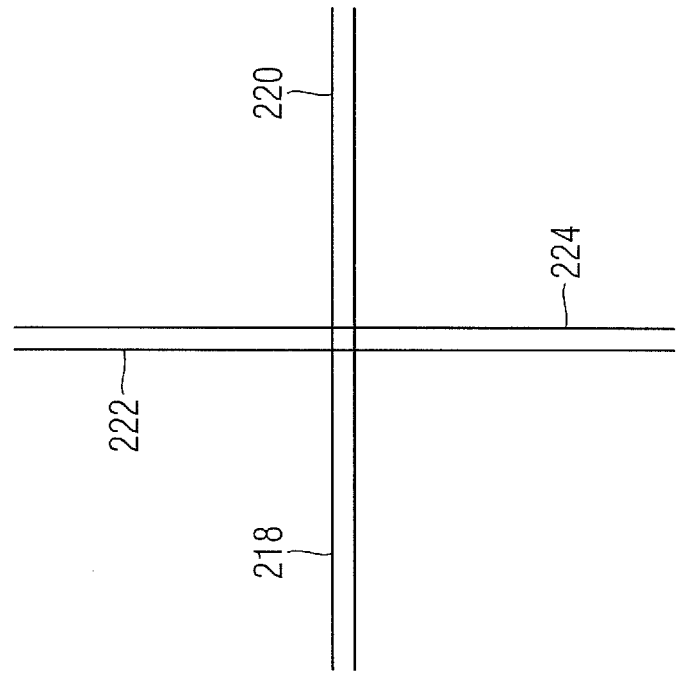
FIG. 7C shows schematically a state following FIG. 7B.
Figure 7B:
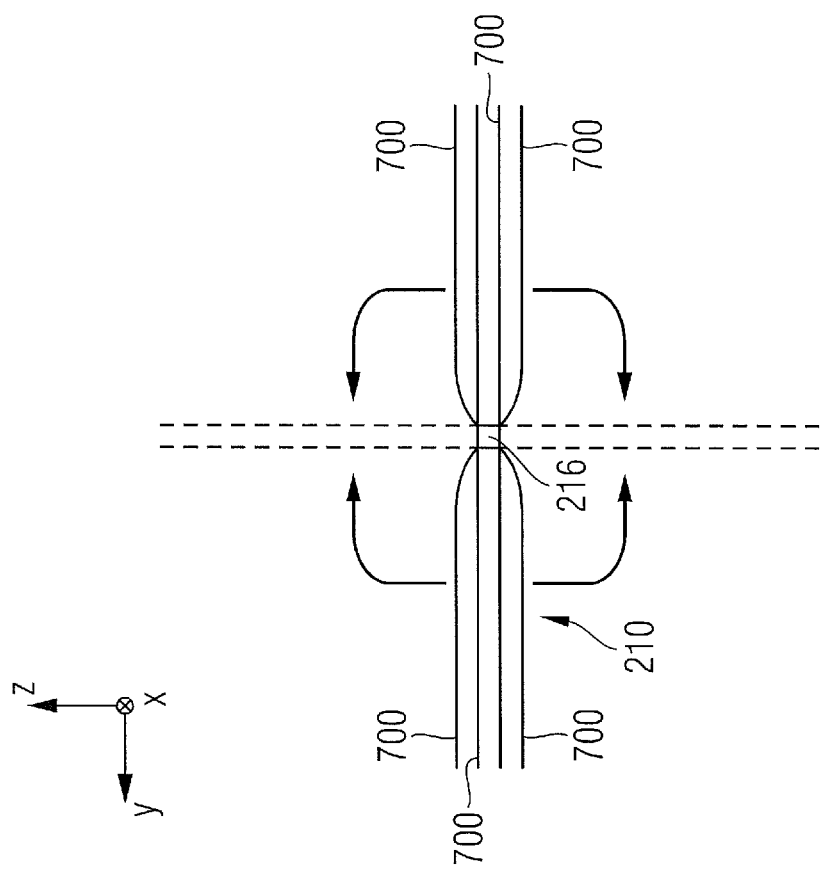
FIG. 7B shows schematically a first state during production of the first and second fibre portions from FIG. 7A.

FIGS. 7B and 7C show schematically two states during production of the fibre construct 210 from FIG. 7A.

FIG. 7B shows how all the arms 700 are woven substantially in one plane. After this, the two upper and two lower arms 700 are bent upwards and downwards respectively such that, as shown in FIG. 7C, the webs 222, 224 and the portions 218, 220 are formed.

Figure 7D:
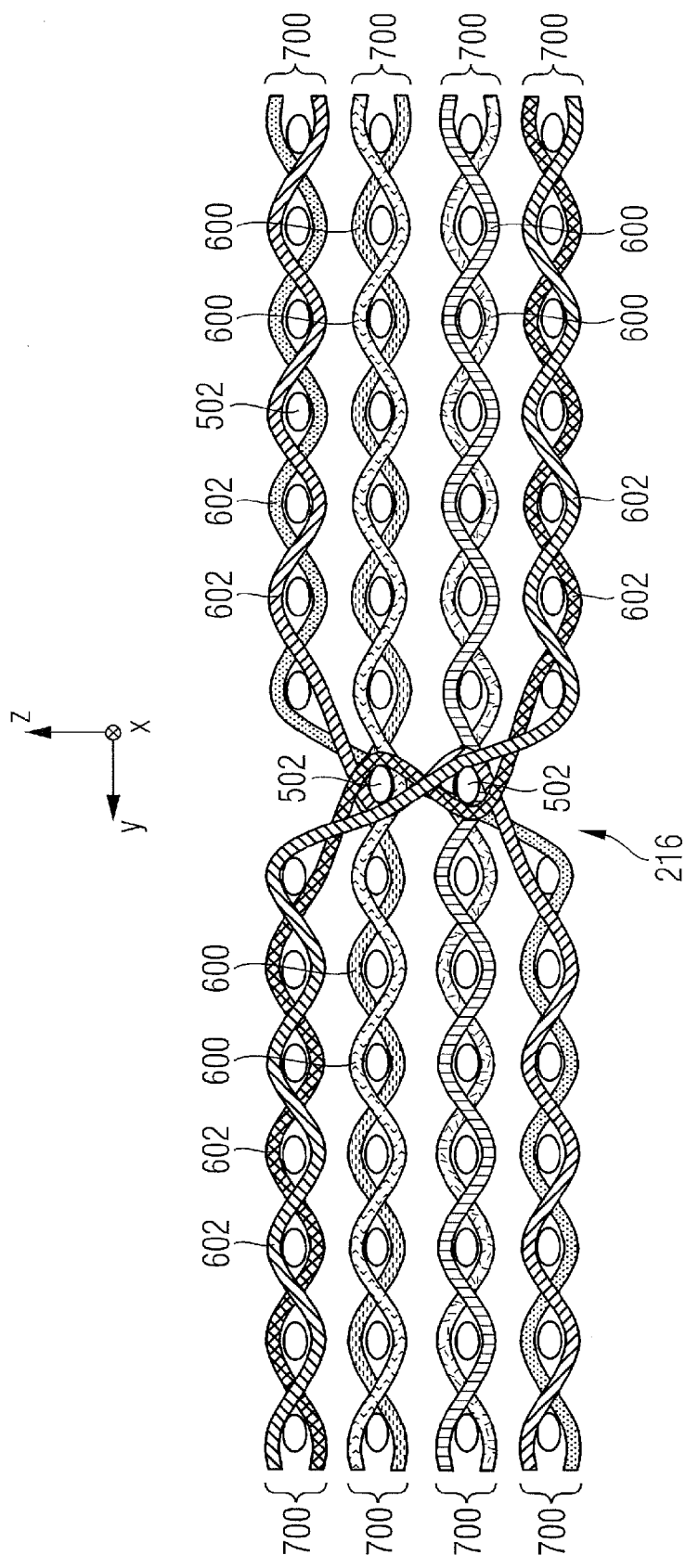
FIG. 7D shows in detail fibre orientations from FIG. 7B according to one embodiment.

FIG. 7D shows in detail the fibre orientations from FIG. 7B according to one embodiment. In the embodiment according to FIG. 7D, the fibres 602 are each woven in such a way that they extend in the diagonally opposing arms 700. In the region of the crossing point 216, the fibres 602 accordingly extend obliquely in the YZ plane and in particular between two fibres 502.

Figure 7E:
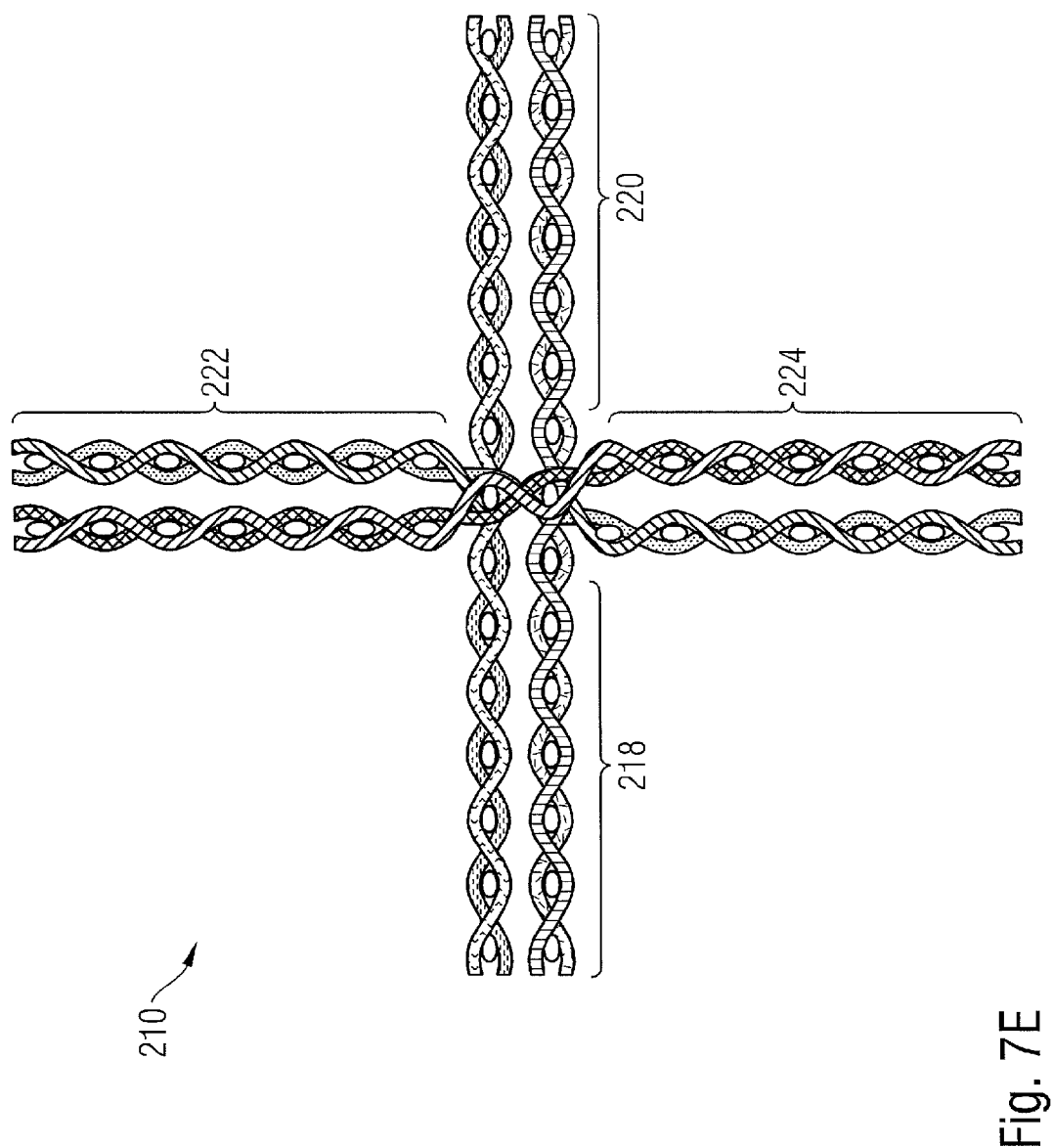
FIG. 7E shows in detail fibre orientations from FIG. 7C according to one embodiment.

FIG. 7E shows in detail the fibre orientations from FIG. 7C according to one embodiment.

Figure 7F:
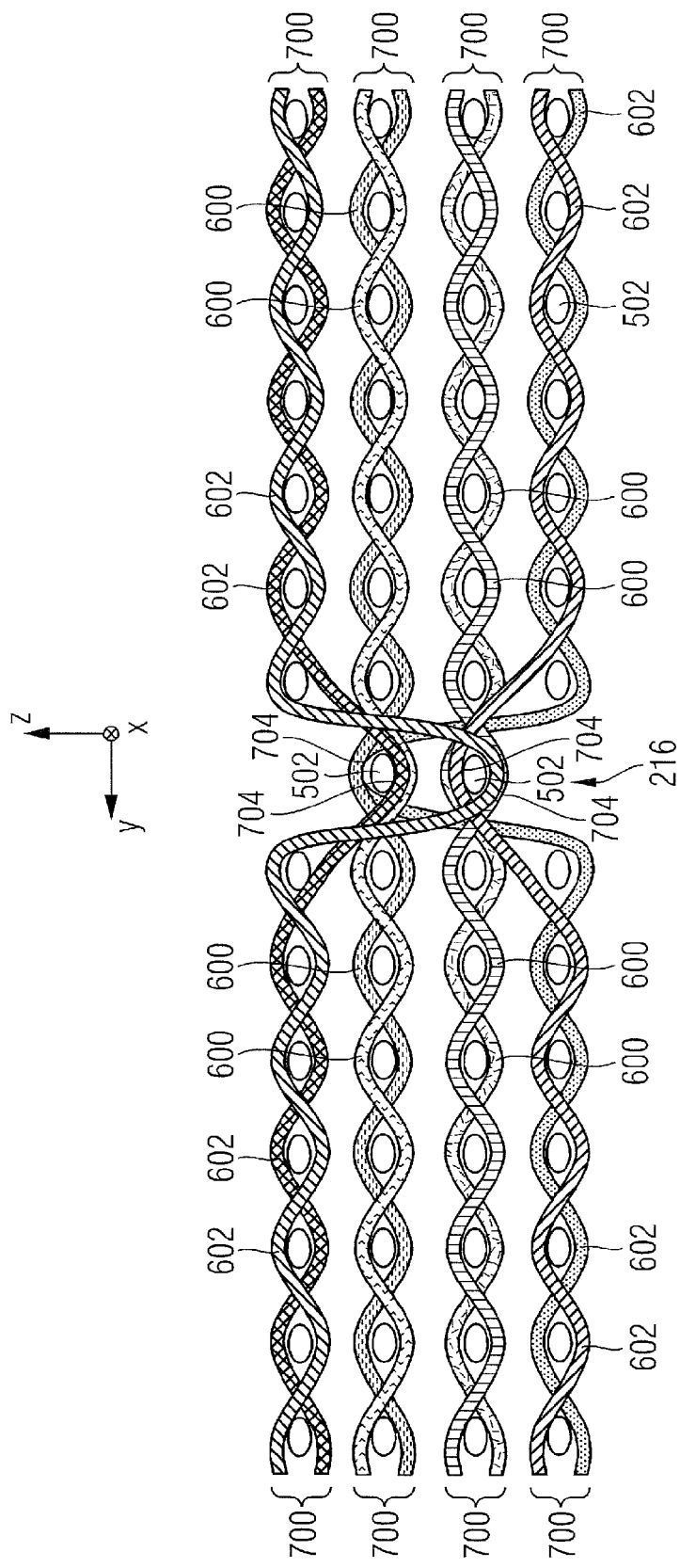
FIG. 7F shows a variation on the embodiment according to FIG. 7D.

FIG. 7F shows a variation on the embodiment according to FIG. 7D, which variation comprises a different fibre orientation. In the embodiment according to FIG. 7F, the fibres 602 are each woven in such a way that they extend in the directly opposing arms 700, that is to say in arms 700 which are located in the same XY plane. In the region of the crossing point 216, the fibres 602 accordingly extend in a U-shape in the YZ plane and in particular between two fibres 502. A respective fibre 602 preferably winds around a fibre 502 at the point denoted by reference numeral 704.

In particular with reference to the fibre orientation shown in FIG. 6A to 7F, it is clear that—after the reshaping step to form the respective fibre construct 210—the fibres 602 guide the first load 230 substantially in the XY plane through the crossing point 216, while the fibres 600 guide the second load 235 in the XY plane through the crossing point 216. The first and the second load 230, 235 have basically no effect on each other.

The weaving methods shown in FIG. 6A to 7F are referred to herein as weaving methods in two and a half dimensions and have the advantage that a corresponding weaving apparatus needs to have only a small weaving capacity in the Z direction (third dimension).

A further embodiment of a structural arrangement 200 will be described below with reference to FIG. 8A to 8D.

Figure 8A:
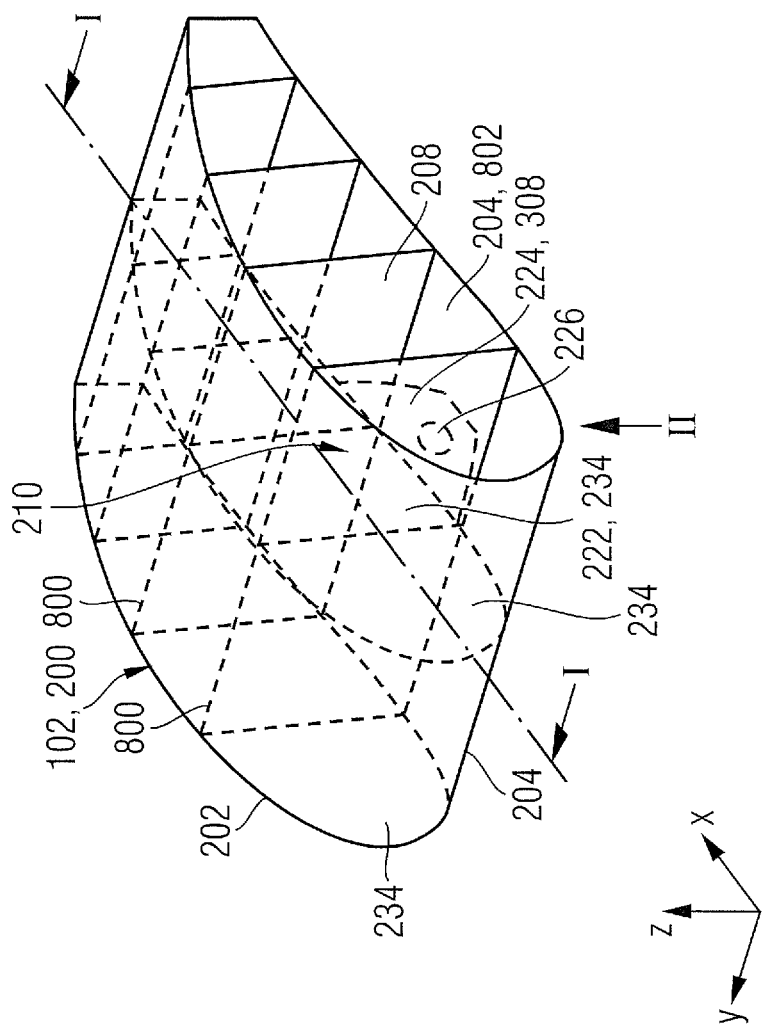
FIG. 8A is a perspective view of a structural arrangement according to a further embodiment of the present invention.

FIG. 8A is a perspective view of the structural arrangement 200. The structural arrangement 200 forms part of a landing flap 102.

The structural arrangement 202 comprises a substantially closed box structure 202 which forms the outer wall 204 of the aerodynamic profile of the landing flap 102. The box structure 202 of FIG. 8A is preferably designed to be open in the Y direction, that is to say the span direction. Ribs 234 and transverse webs 800 extend inside the box structure 202.

A fibre construct 210, as described for example with reference to FIG. 2, is integrated into the box structure in such a way that the outer web 224 of said fibre construct extends downwards in the Z direction. The inner web 222 of the fibre construct 210 points into an interior 208 of the box structure 202 and is preferably integrated into the rib 234. The first and second portions 218, 220 of the fibre construct 210 are integrated into the lower outer wall 802. The eye 226 is thus arranged below the box structure 202 and is thus suitable to be connected to a flap carriage 106 (not shown).

Figure 8B:
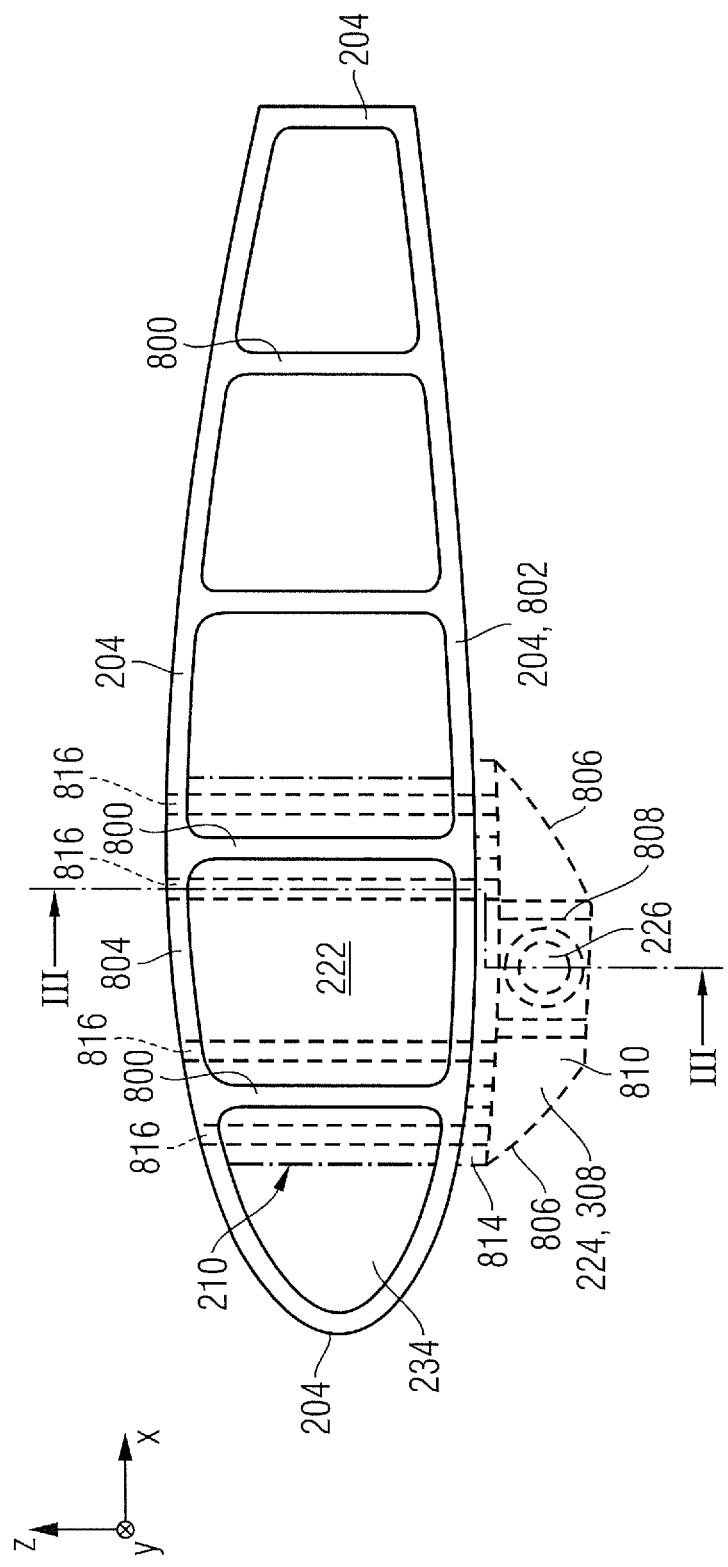
FIG. 8B is a sectional view along line I-I from FIG. 8A.

As is clear from the sectional view along the line I-I from FIG. 8A, which is shown in FIG. 8B and shows a more specific configuration than that of FIG. 8A, the web 222 is located inside the rib 234, which is preferably connected at the entire periphery thereof to the outer skin 204. The left- and right-hand end of the web 222 in FIG. 8B is indicated by a dot-dash line. The web 222 could also be formed in one piece, in particular 3D woven, with the rib 234.

In particular, FIG. 8B shows that the rib 234 and preferably the inner web 222 adjoin the upper outer wall 804 of the box structure 202 at the top, that is to say are attached thereto.

The outer web 224 and the optionally provided outer rib 308 may comprise bevels 806 in order also to save material.

Figure 8C:
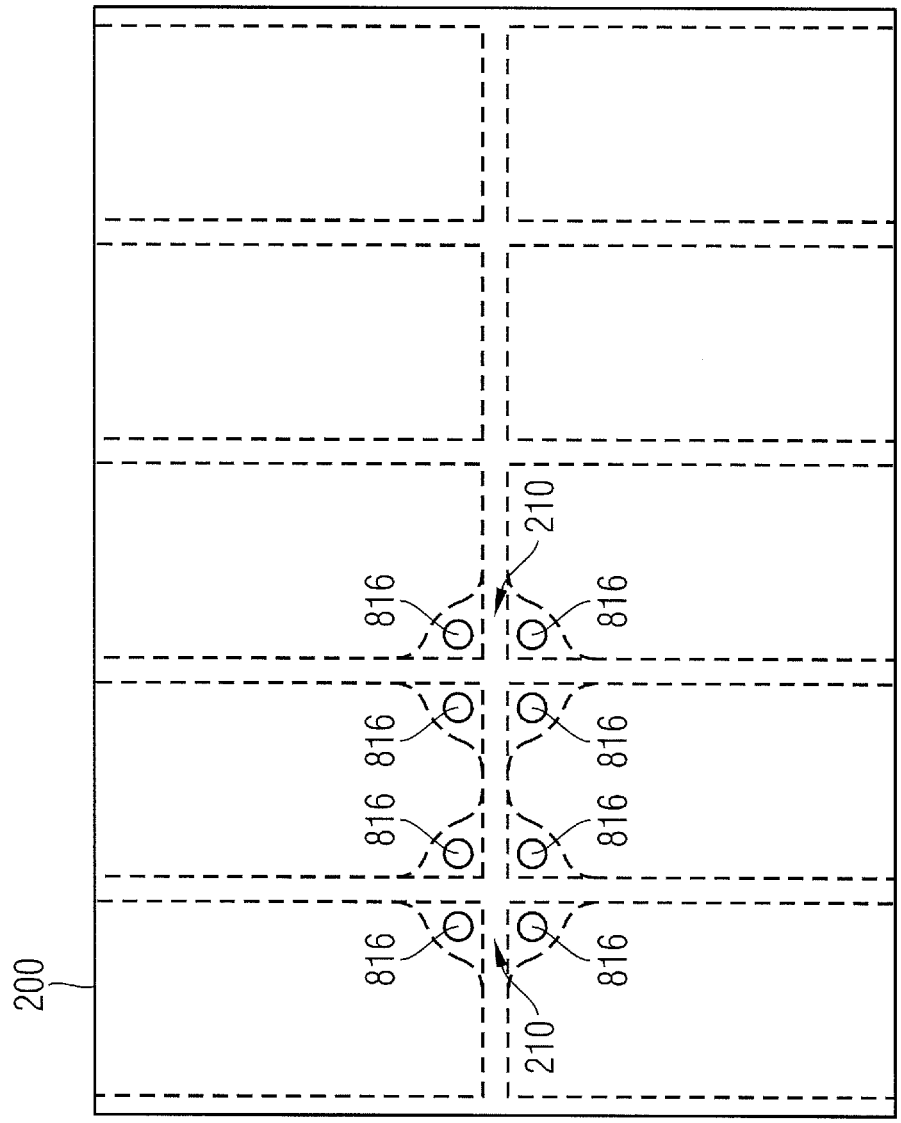
FIG. 8C is a view from below in direction II from FIG. 8A.
Figure 8D:
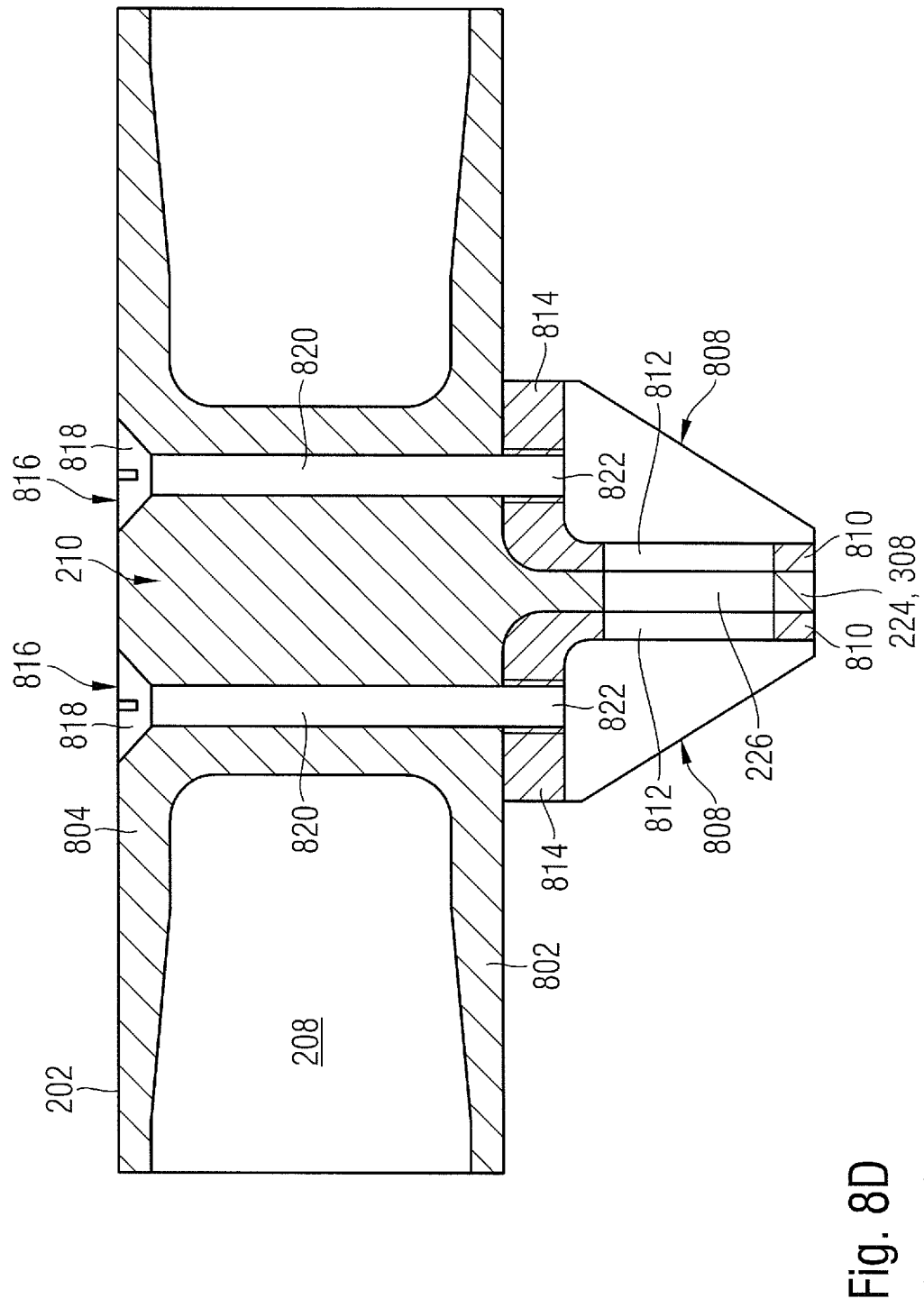
FIG. 8D is a sectional view along line III-Ill from FIG. 8B.

FIG. 8D is a sectional view along the line from FIG. 8B. To facilitate representation, FIG. 8D does not differentiate between the material of the fibre construct 210 and the material of the box structure 202.

FIG. 8D shows that the structural arrangement 200 can also comprise a pair of angles 808, for example made of fibre composite material or metal, which are arranged on either side of the outer web 224 (or optionally of the outer rib 308) and reinforce the eye 226. The angles 808 each comprise webs 810 including eyes 812 which correspond to the eye 226 in the fibre construct 210. The angles 808 each also comprise a foot 814 by which they rest against the lower outer wall 802. The feet 814 are typically each attached to the box structure 202 by four bolts 816. The bolts 816 may comprise a head 818 by which they engage behind the upper outer wall 804 and the shank 820 of said bolts can extend through the fibre construct 210. The end 822 of a respective shank 820 is screwed to the corresponding foot 814.

As shown in FIG. 8C, which is a view from below in direction II from FIG. 8A, eight bolts 816 per fibre construct 210 can be provided, which penetrate said fibre construct or are arranged adjacent thereto. To provide a better overview, the angles 808 and the web 224 are not shown in the view of FIG. 8C.

According to another alternative configuration, the box structure 202, the fibre construct 210 and optionally also the transverse webs 800 could be produced in one piece by 3D weaving.

Figure 9:
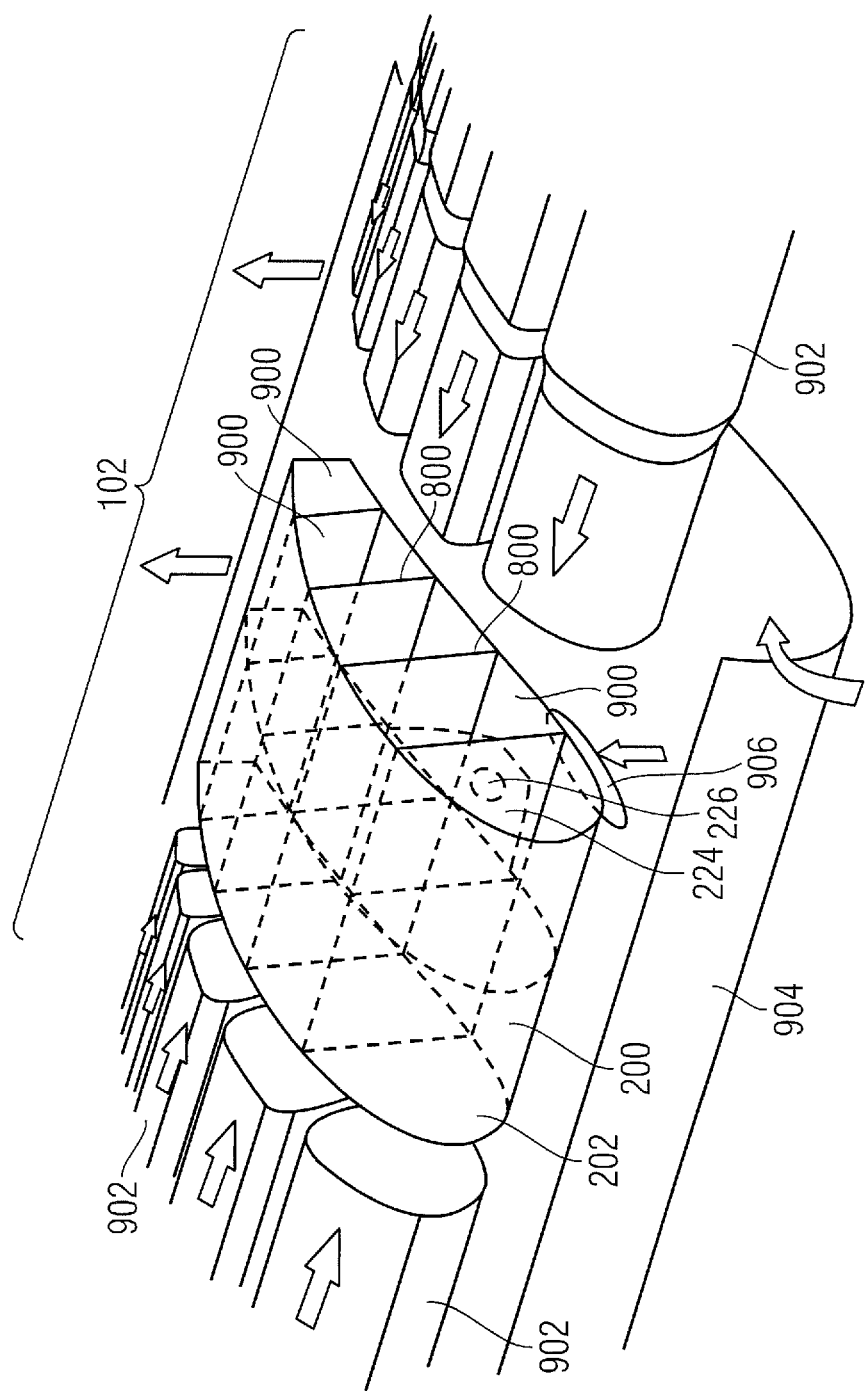
FIG. 9 is a perspective view of a structural arrangement according to yet another embodiment of the present invention.

FIG. 9 shows part of a landing flap 102 in multi-spar construction, which comprises a structural arrangement 200 which can be designed according to the model of FIG. 8A to 8D.

Tubes 902 made of fibre composite material, in particular CFRP, are inserted in the span direction into intermediate spaces 900 formed by the box structure 202 and the transverse webs 800. In contrast to the embodiment according to FIG. 8A to 8D, in the embodiment according to FIG. 9 a separate skin 904 is provided which externally surrounds the box structure 200 and the tubes 902 after assembly thereof (indicated by the arrows in FIG. 9). The skin 904 comprises an opening 906 through which the outer web 224 comprising the eye 226 (optionally also including the angles 808) is slid. The eye 226 is obviously accessible from the underside after assembly.

According to one embodiment, the structural arrangement 200, the tubes 902 and the skin 904 are preformed from dry woven fabric and after assembly the entire construction is infiltrated with a resin matrix and cured.

According to another embodiment, the structural arrangement 200, the tubes 902 and the skin 904 can be partially cured and after assembly the entire construction is infiltrated with a resin matrix and cured.

According to a further embodiment, the structural arrangement 200, the tubes 902 and the skin 904 can be cured and the entire construction is adhesively bonded.

Figure 10A:
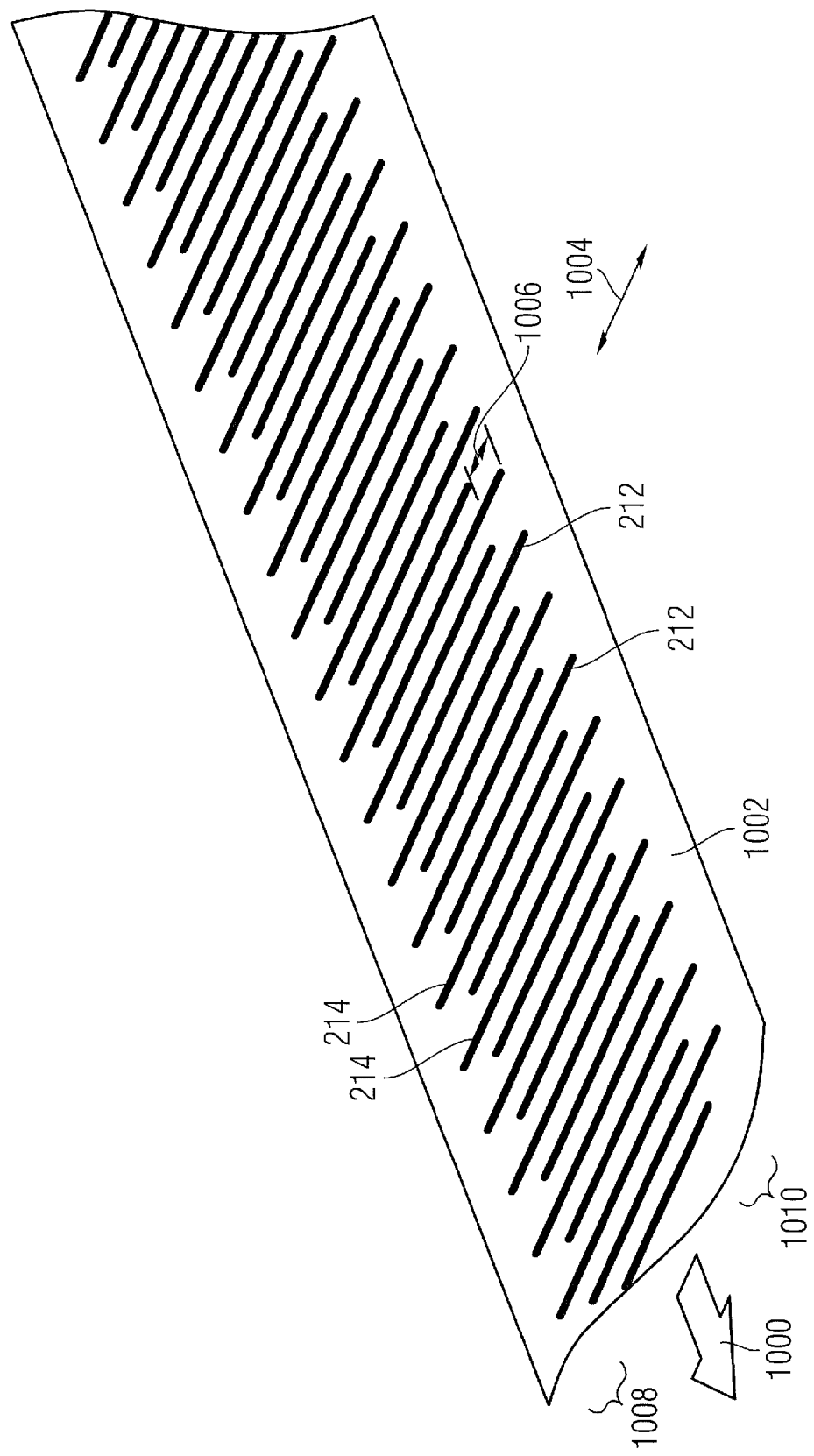
FIG. 10A-10C show further states during production of first and second fibre portions from FIG. 2.
Figure 10B:
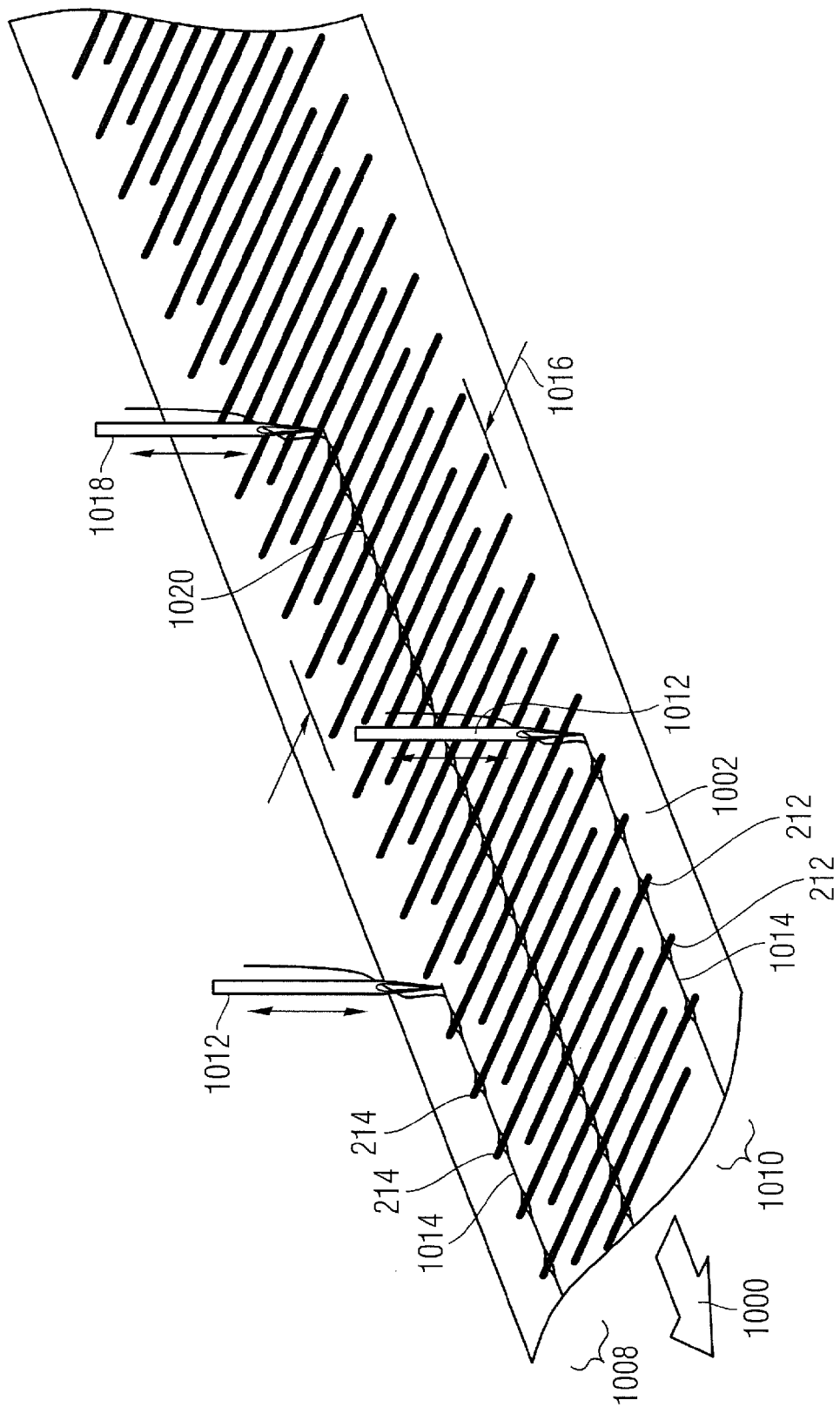
Figure 10C:
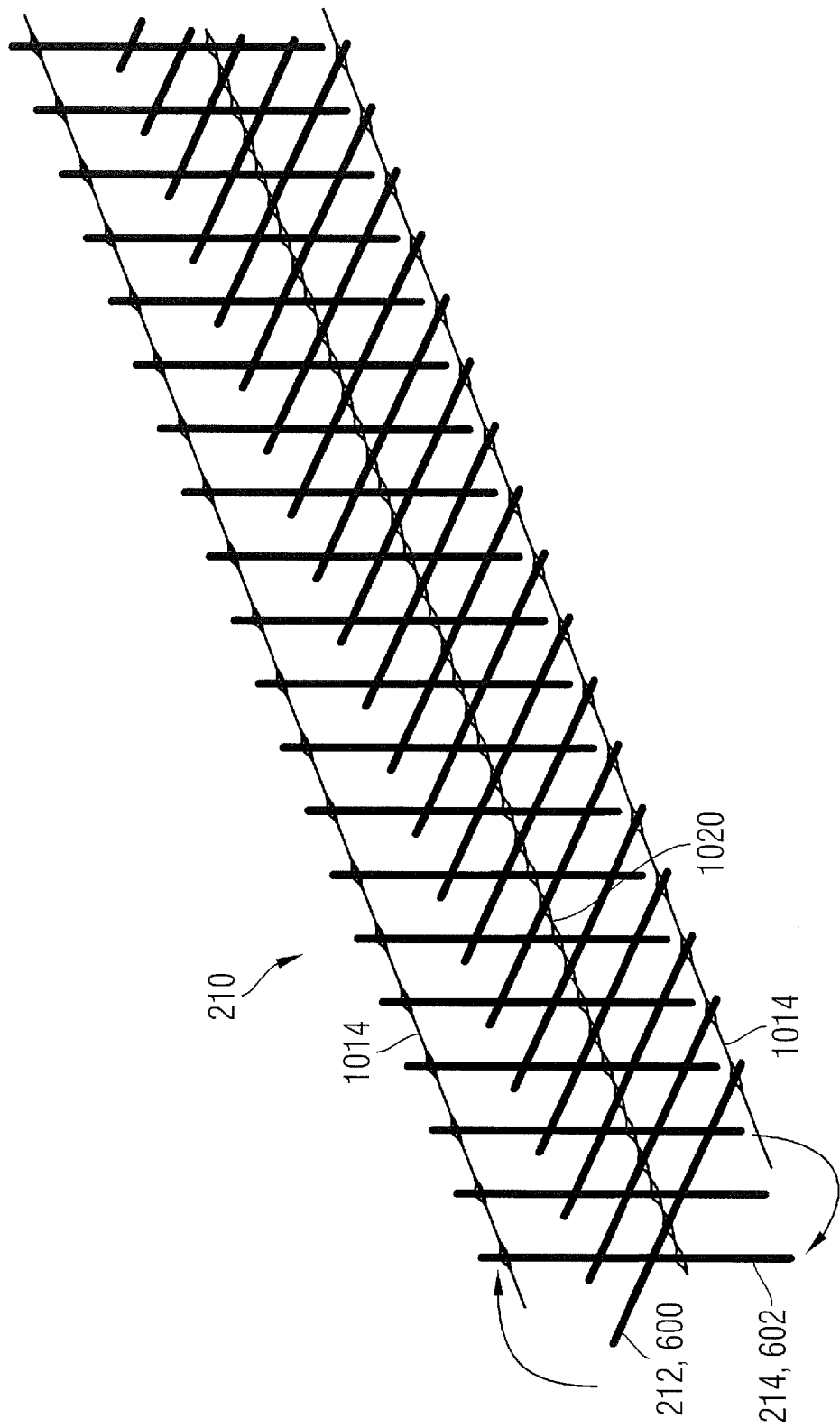

FIG. 10A to 10C show a plurality of states during production of first and second fibre portions from FIG. 2 in a sewing method according to a further embodiment of the present invention.

First and second fibre portions 212, 214 are laid on a conveyor belt 1002 which is moved in the conveying direction 1000, see FIG. 10A. The fibre portions 212, 214 are preferably each of the same length and extend in the direction 1004 transverse to the conveying direction 1000. The fibre portions 212, 214 each have an offset 1006 from one another in the transverse direction 1004 in the state in FIG. 10A. Edge regions 1008, 1010 are produced as a result, one edge region 1008 comprising only ends of the second fibre portions 214 and the other edge region 1010 comprising only ends of the first fibre portions 212.

FIG. 10B shows how the ends of the second fibre portions 214 are sewn together in the end region 1008. The ends of the first fibre portions 212 are also sewn together in the other edge region 1010. Corresponding needles and sewing fibres are denoted by reference numerals 1012 and 1014.

The first and second fibre portions 212, 214 are also sewn together along a centre line arranged centrally in relation to a total extension 1016 of the fibre portions 212, 214 in the transverse direction 1004. A corresponding needle and sewing fibre are denoted by reference numerals 1018 and 1020. The movement of the needles 1012, 1018 is indicated by a double-headed arrow in each case.

After this, the second fibre portions 214 are rotated about the centre line, that is to say about the sewing fibre 1020, in relation to the first fibre portions 212, as indicated by the arrows in FIG. 10C. A fibre construct 210 is thus formed which hereafter is integrated into a box structure 200, see FIG. 2.

In the case of the fibre construct 210, the first and second fibre portions 212, 214 are obviously formed of different fibres 600, 602.

Instead of a sewing method, the different fibres 600, 602 can be interwoven or interlaced by means of fibres 1014, 1020. As a further alternative, the different fibres 600, 602 can be adhesively bonded to each other in particular by means of a thermoplastic strand, a thread coated with thermoplastic material, or an adhesive tape.

FIG. 11A shows a further variation on the embodiment according to FIG. 3A, the portions 218, 220 and the web 222 of the fibre construct 212 each having a constant thickness 300, that is to say not tapering. An additional web 1100 is also provided which extends perpendicular to the web 222 and the portions 218, 220 and is connected to each of these. The web 1100 can be integrated for example into a transverse web 800, see FIGS. 8A and 8B, and be connected thereto or form said web. The web 1100 is located in the YZ plane.

The fibre construct 212 is preferably produced as one piece by means of 3D weaving.

FIG. 11B shows the embodiment from FIG. 11A, the portions 218, 220 and the webs 222, 1100 of the fibre construct 212 each tapering, as already shown in FIG. 3A.

Although the present invention has been described by way of preferred embodiments, it is not in any way limited thereto, but can be modified in various ways. In particular, the embodiments and configurations described for the structural arrangement can be applied accordingly to the vehicle according to the invention and the method according to the invention, and vice versa. Furthermore, "a" or "one" does not exclude a plurality in the present case. In particular, the structural arrangement according to the invention can be applied not only in landing flaps but in all box structures, for example control flaps.

What is claimed is:

1. A structural arrangement, in particular for an aircraft or spacecraft, comprising:
    a box structure;
    a first fibre portion which extends in a first plane;
    a second fibre portion which extends in a second plane which intersects the first plane, the first and the second fibre portion being interconnected at a crossing point thereof, wherein the first fibre portion comprises a first portion on one side of the crossing point and a second portion on the other side of the crossing point, the first portion of the first fibre portion being integrated into a first portion of the box structure and the second portion of the first fibre portion being integrated into a second portion of the box structure, and wherein the second fibre portion forms, on one side of the crossing point, an inner web inside the box structure and, on the other side of the crossing point, an outer web outside the box structure;
    a supporting element which is connected to the inner web; and
    an attachment point for introduction of a first load into the outer web;
    wherein the second fibre portion guides the first load which is introduced at the attachment point from the attachment point into the supporting element, and the first fibre portion simultaneously transfers a second load between the first and the second portion of the box structure.

2. The structural arrangement according to claim 1, wherein the first and/or the second portion of the first fibre portion is glued into the first and/or the second portion of the box structure, and/or the inner web is integrated, in particular glued, into the supporting element, the supporting element preferably being designed as a rib, transverse web or spar and/or being connected to the box structure.

3. The structural arrangement according to claim 1, wherein the first portion, second portion, inner and/or outer web tapers in a direction away from the crossing point.

4. The structural arrangement according to claim 1, wherein the first and the second plane are substantially perpendicular to each other.

5. The structural arrangement according to claim 1, wherein the first and/or the second fibre portion is embedded in a matrix.

6. A method for producing a structural arrangement, in particular the structural arrangement according to claim 1, in particular in the aviation and aerospace industry, the method comprising:
providing a box structure;
providing a first fibre portion which extends in a first plane;
providing a second fibre portion which extends in a second plane which intersects the first plane;
interconnecting the first and the second fibre portion at a crossing point thereof;
integrating a first portion of the first fibre portion on one side of the crossing point into a first portion of the box structure and integrating a second portion of the first fibre portion on the other side of the crossing point into a second portion of the box structure, the second fibre portion forming, on one side of the crossing point, an inner web inside the box structure and, on the other side of the crossing point, an outer web outside the box structure;
connecting the inner web to a supporting element; and
providing an attachment point for introduction of a first load into the outer web, the second fibre portion guiding the first load which is introduced at the attachment point from the attachment point into the supporting element, and the first fibre portion simultaneously transferring a second load between the first and the second portion of the box structure.

7. The structural arrangement according to claim 1, wherein the first and the second portion are part of the same fibre or different fibres.

8. The structural arrangement according to claim 7, wherein the fibres are interwoven with other fibres in three dimensions and/or the different fibres are interwoven with other fibres in two and a half dimensions.

9. The structural arrangement according to claim 7, wherein the different fibres are sewn together, interwoven or interlaced by fibres and/or the different fibres are adhesively bonded to each other in particular by a thermoplastic strand, a thread coated with thermoplastic material, or an adhesive tape.

10. The structural arrangement according claim 1, wherein the attachment point is designed as an eye, metal fitting, rivet field, bonded joint and/or weld.

11. The structural arrangement according to claim 10, wherein the eye is designed for mounting a control member, in particular a flap carriage, a lever and/or a coupling rod.

12. An aircraft or spacecraft comprising a structural arrangement according to claim 1.

13. A vehicle according to claim 12, wherein a control flap comprises the structural arrangement.

14. The vehicle according to claim 12, wherein an adjusting member arranged at an aerofoil or control surface acts on an eye of the structural arrangement.

15. The vehicle according to claim 14, wherein the adjusting member is designed as a flap carriage which is displaceably arranged at the aerofoil or control surface and is in engagement with the eye of the structural arrangement.

* * * * *